| | READ·IN | TRANSFER | COMPUTE |
|---|---|---|---|
| COUNTER A | | | = 1 |
| X 1 | (+) X 1 | (+) 0 | X 1 |
| X 2 | | | X 2 |
| X 5 | | | X 5 |
| COUNTER B | | | = 3 |
| X 1 | (+) X 1 | (+) X 2 | X 3 |
| X 2 | | | X 6 |
| COUNTER C | | | = 4 |
| X 1 | (+) X 2 | (+) X 2 | X 4 |
| X 2 | | | X 8 |
| COUNTER D | | | = 7 |
| X 1 | (+) X 2 | (+) X 5 | X 7 |
| COUNTER E | | | = 9 |
| X 1 | (+) X 10 | (−) X 1 | X 9 |

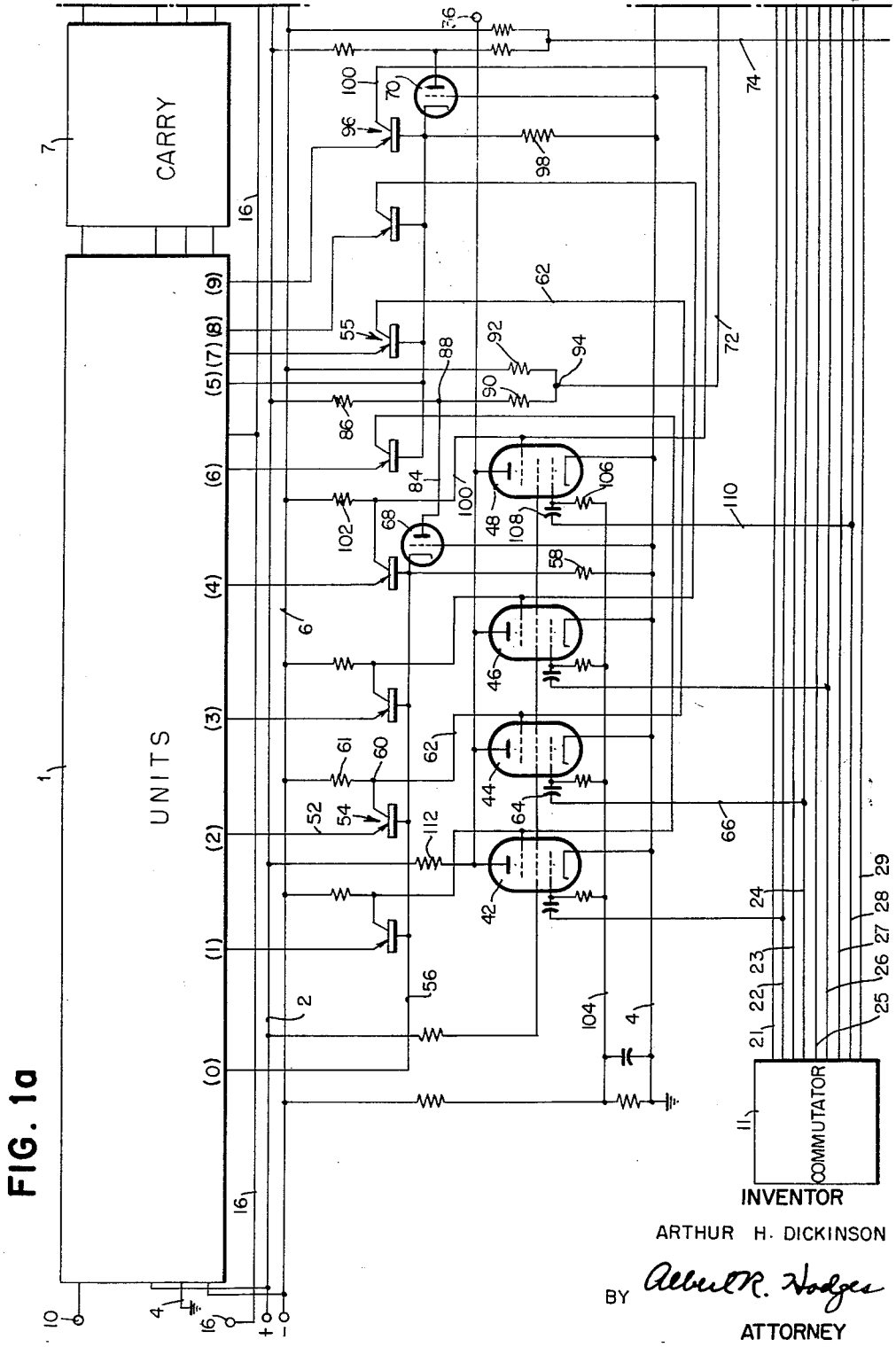

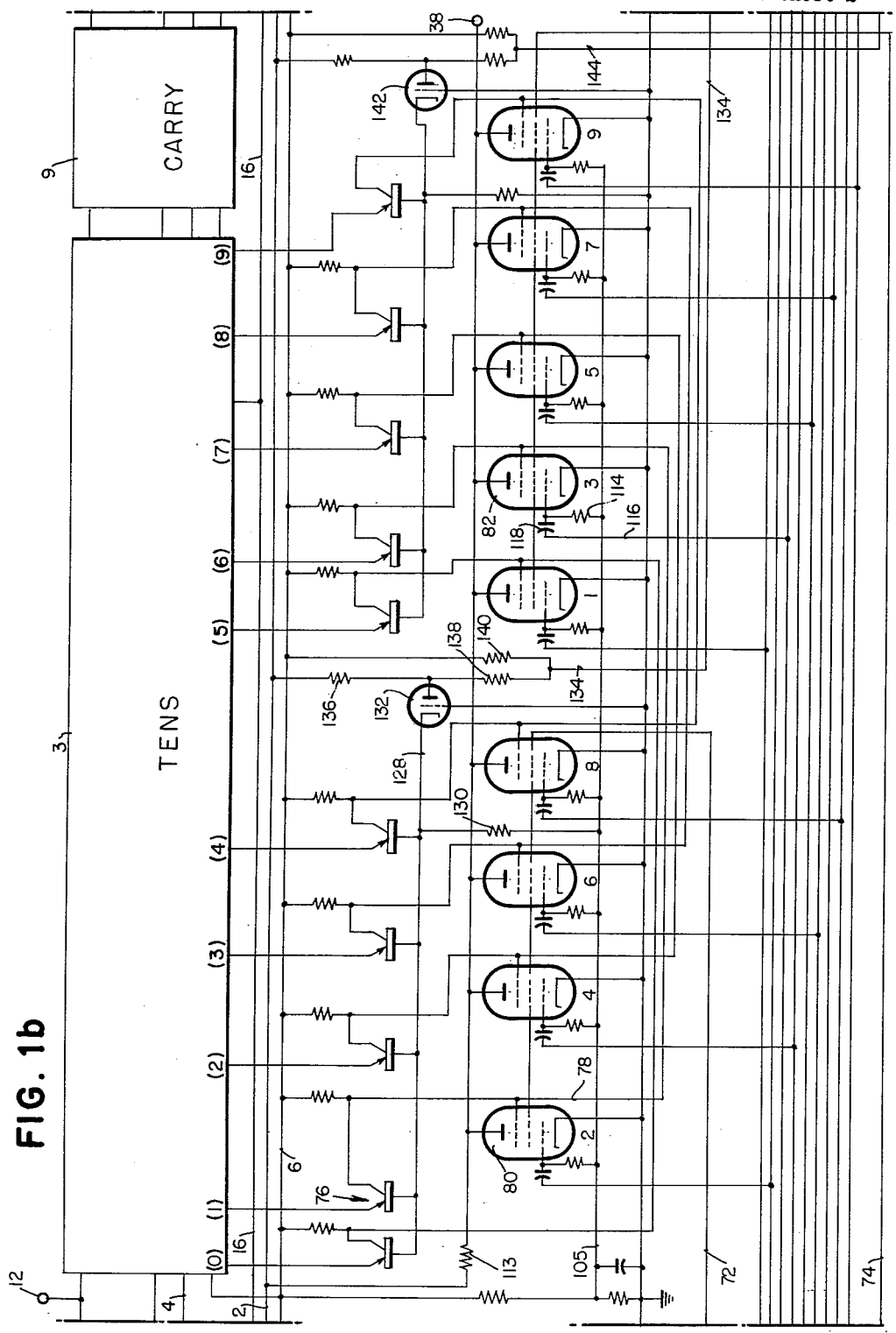

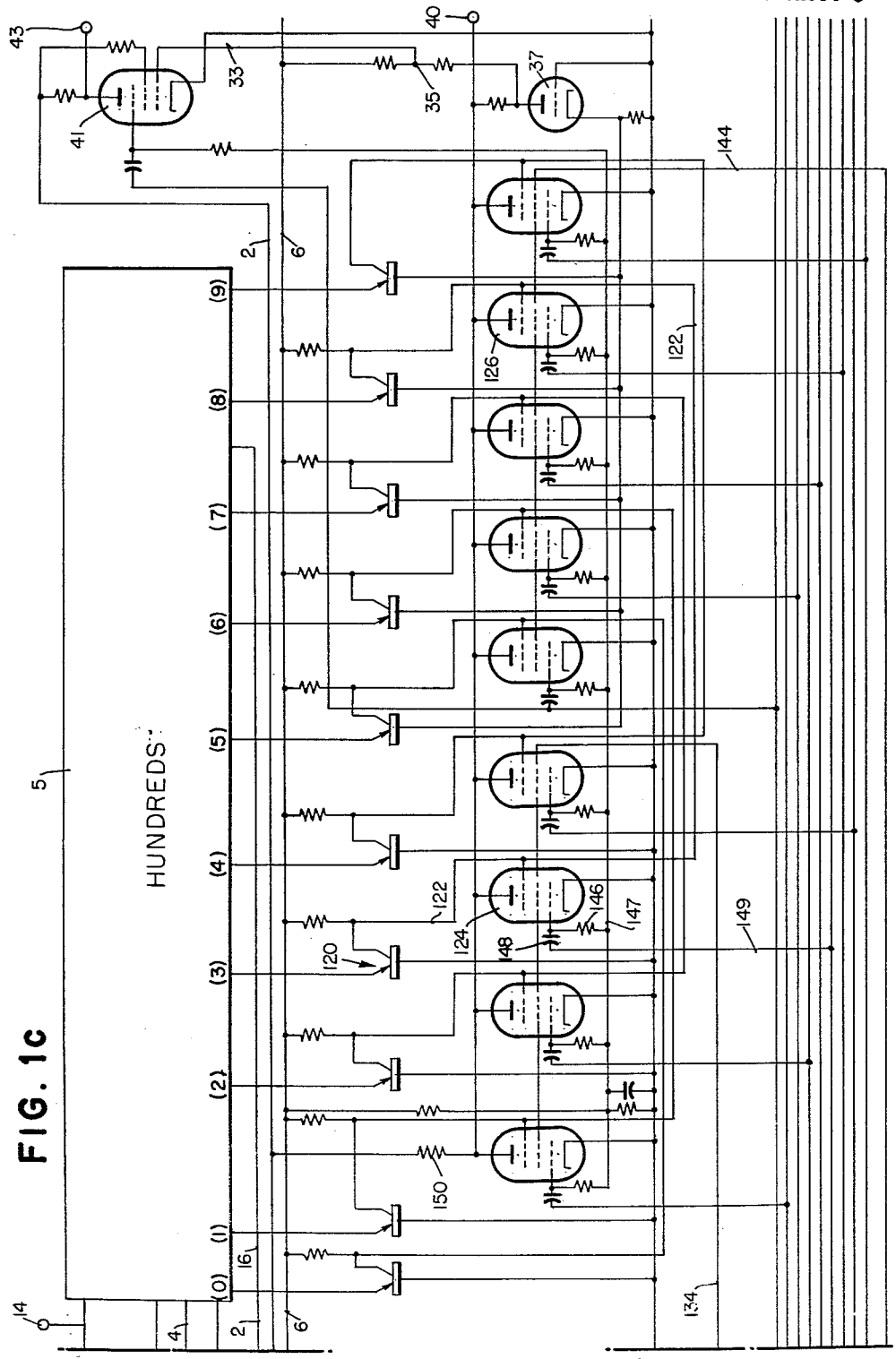

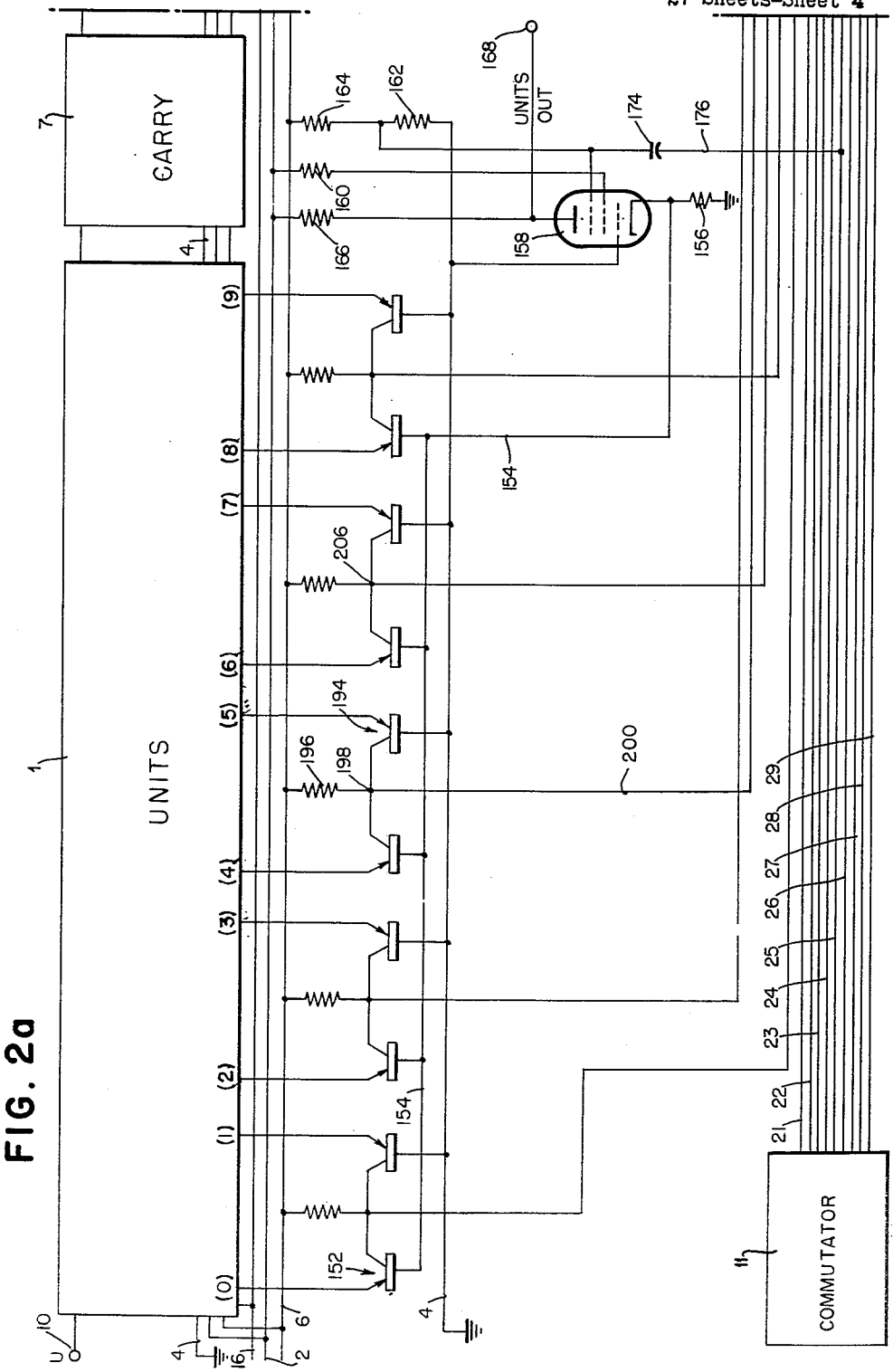

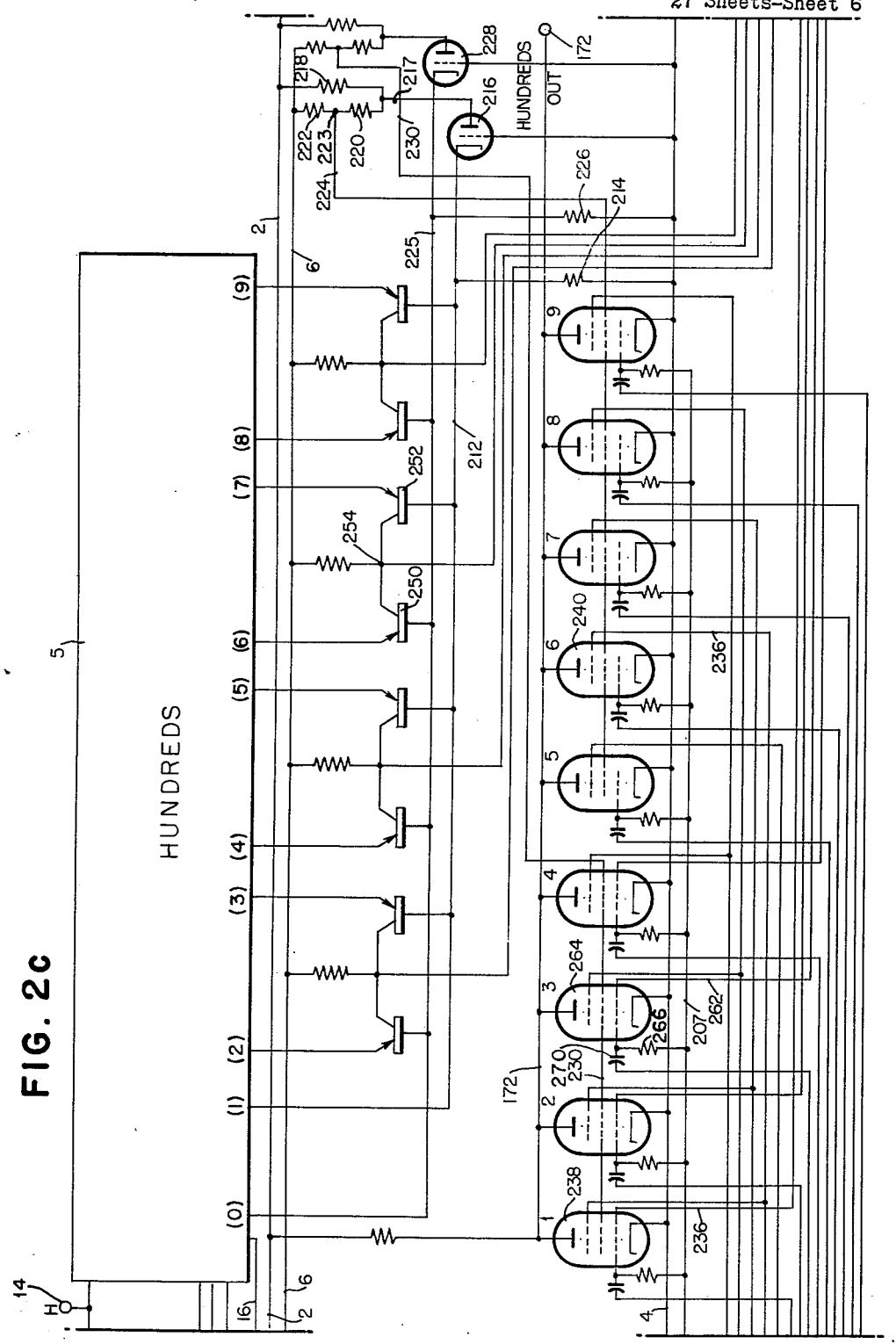

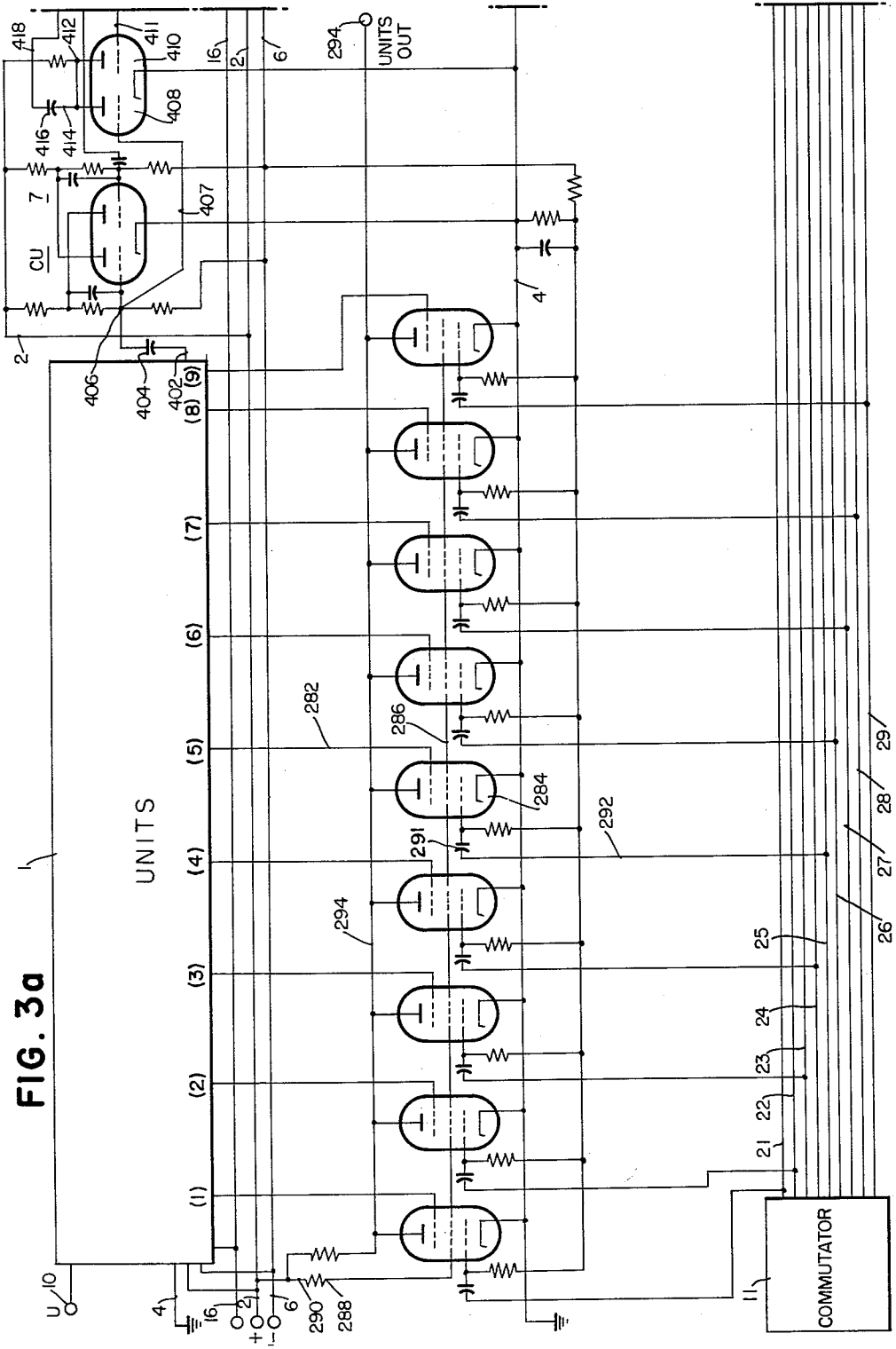

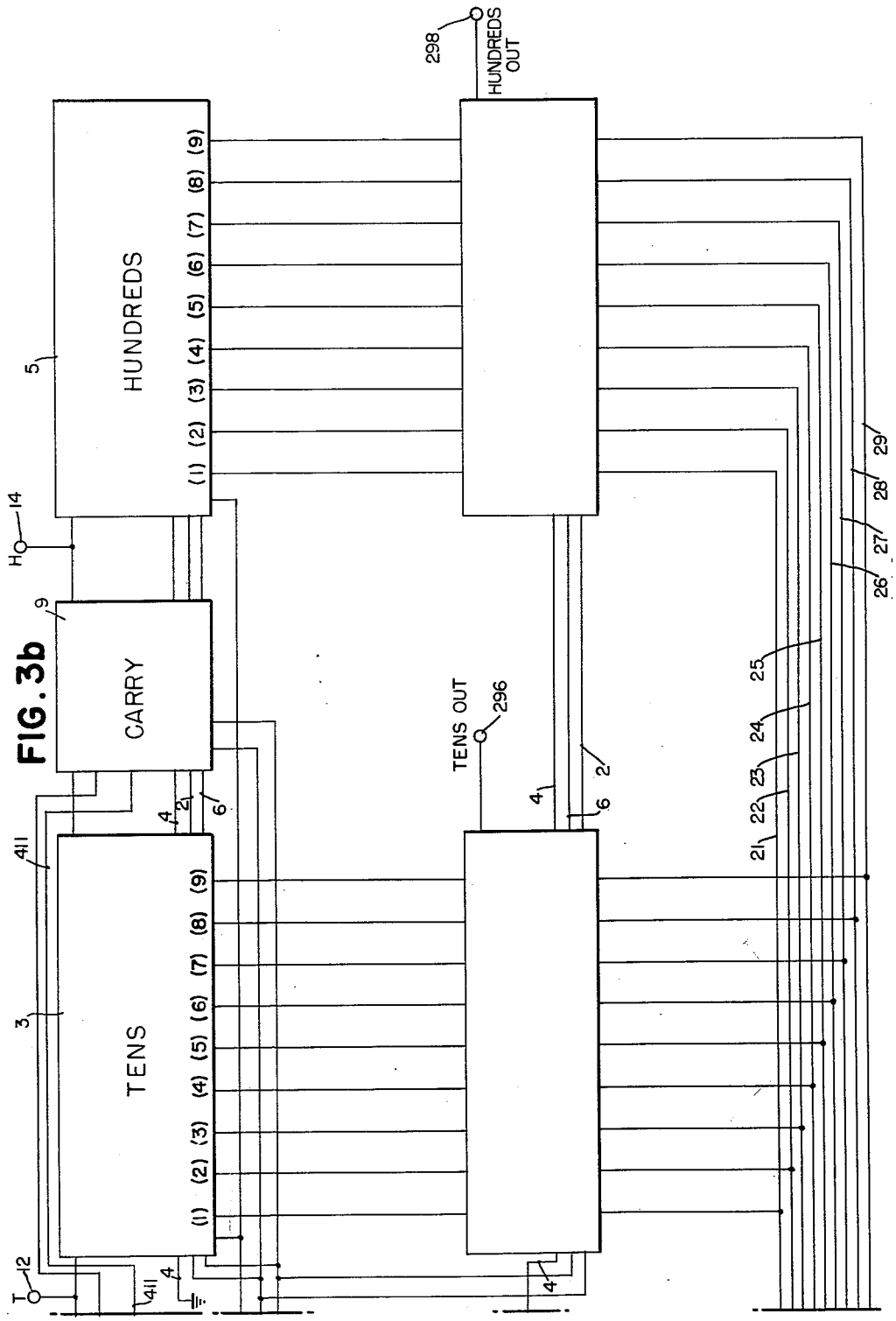

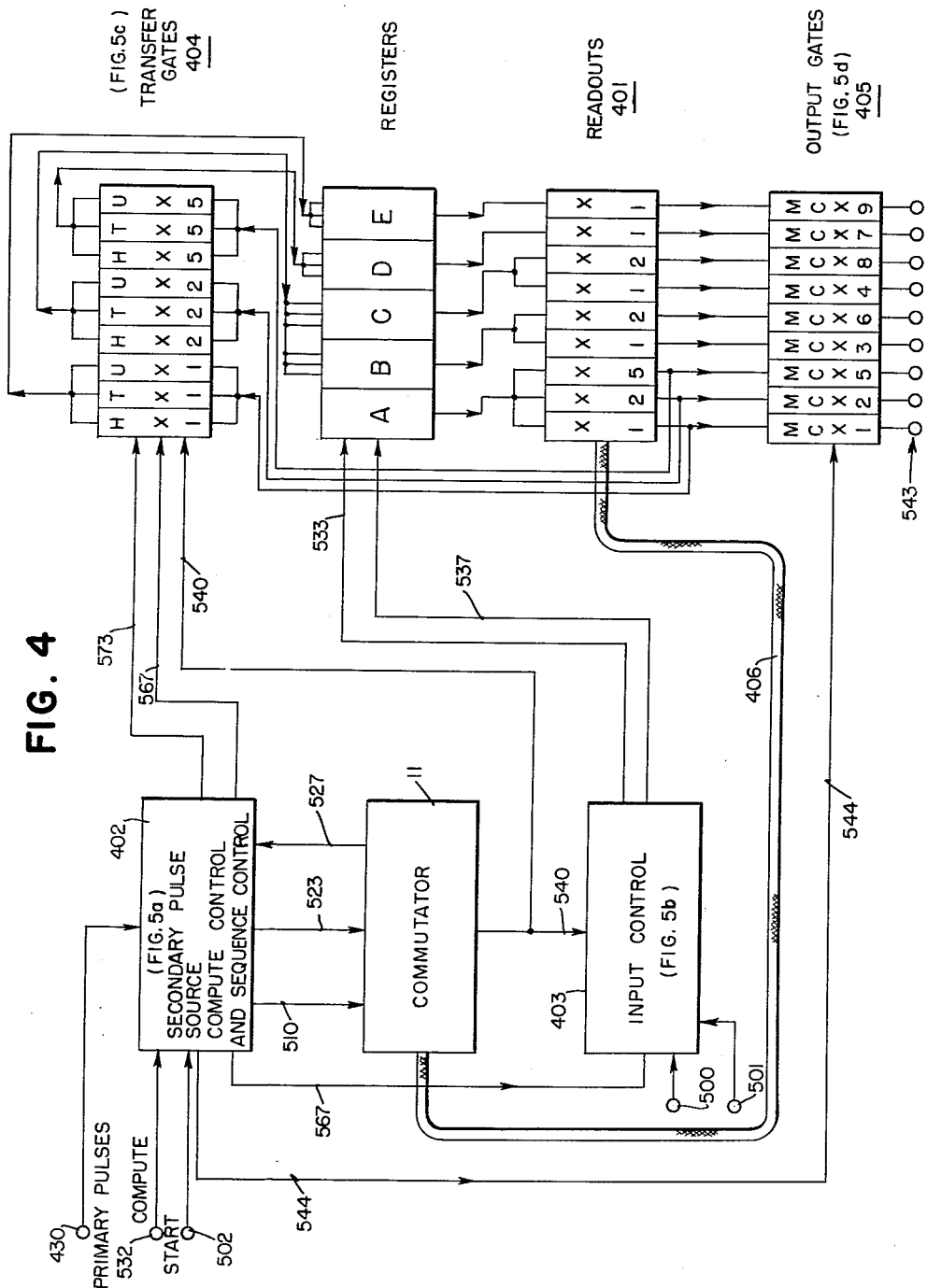

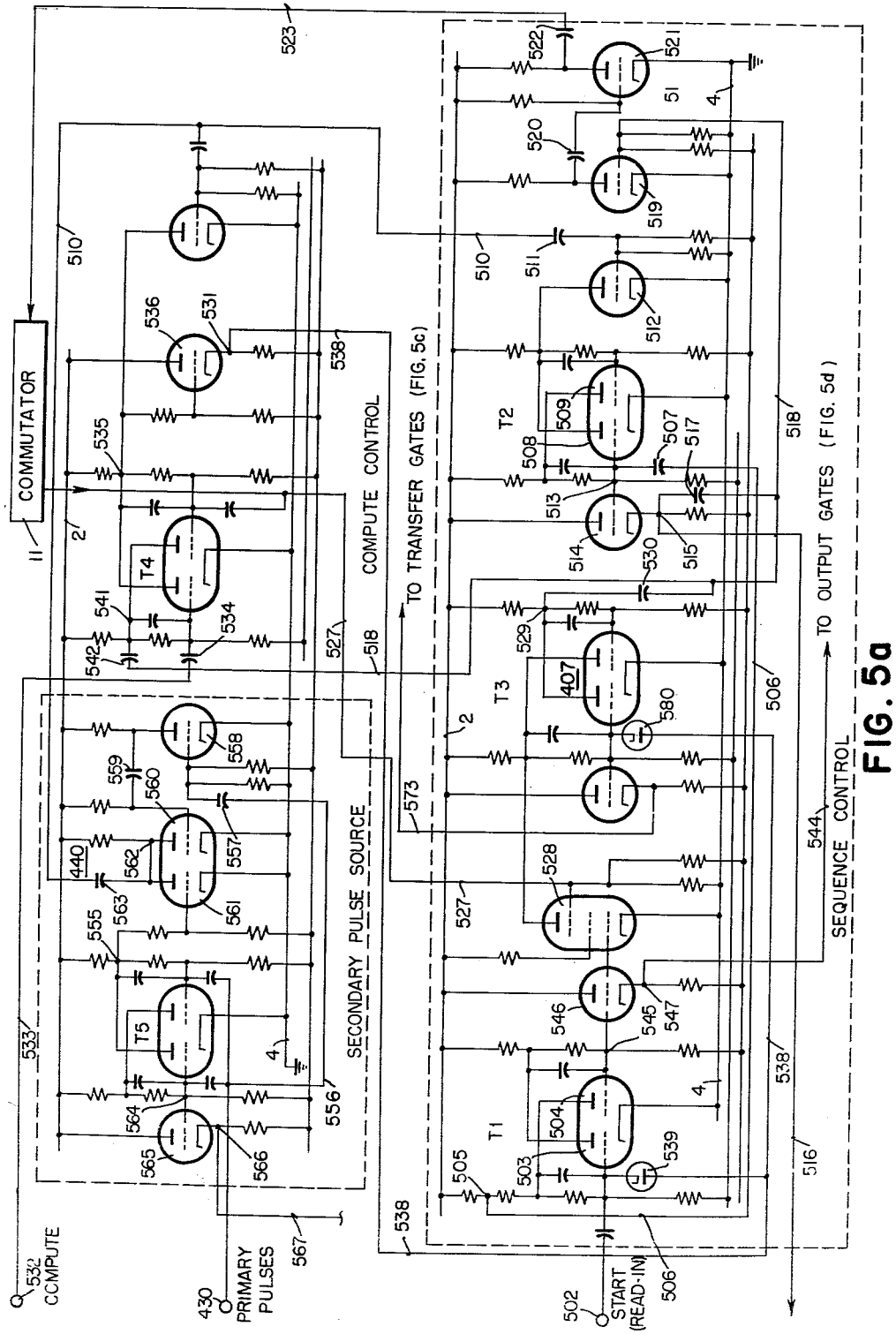

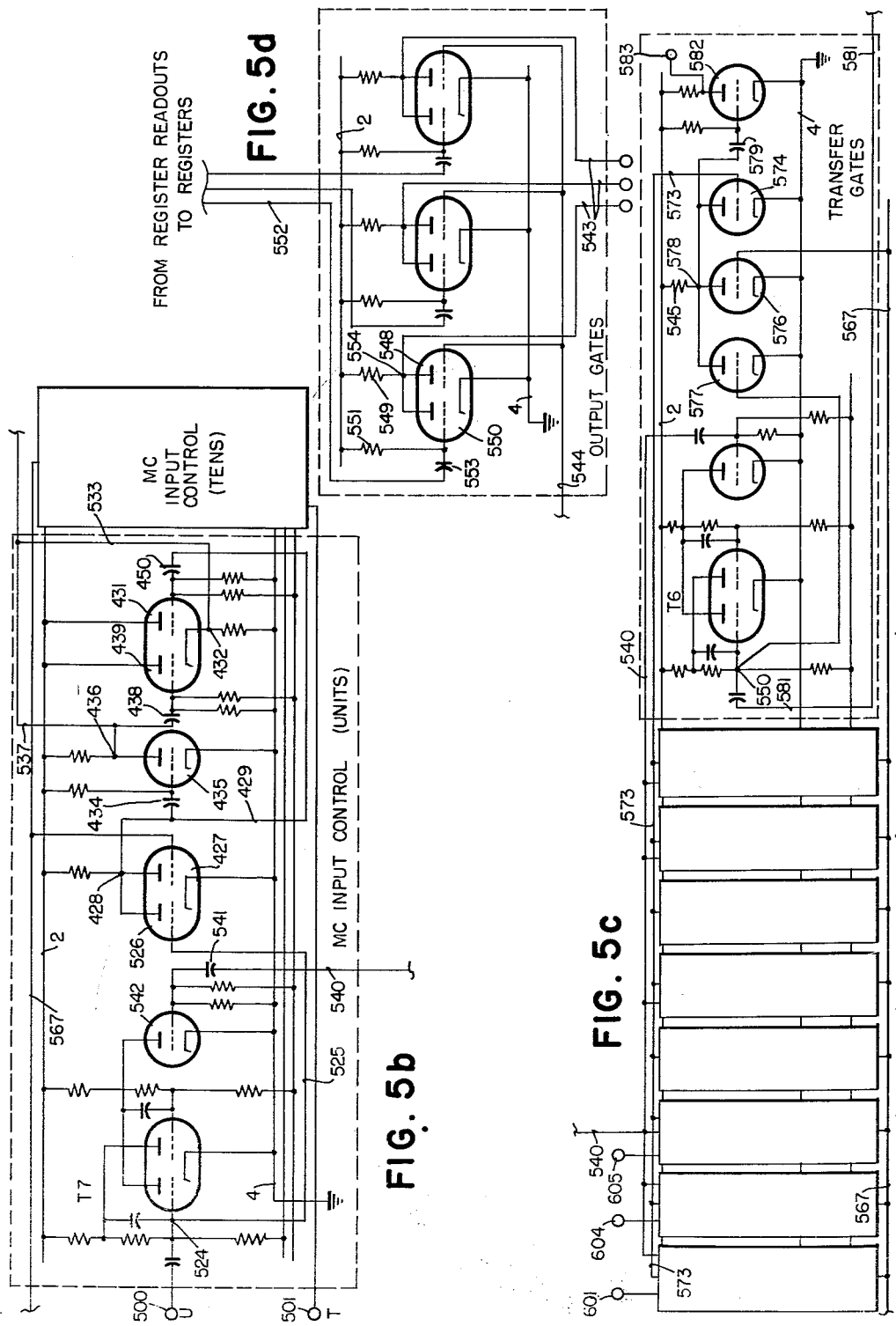

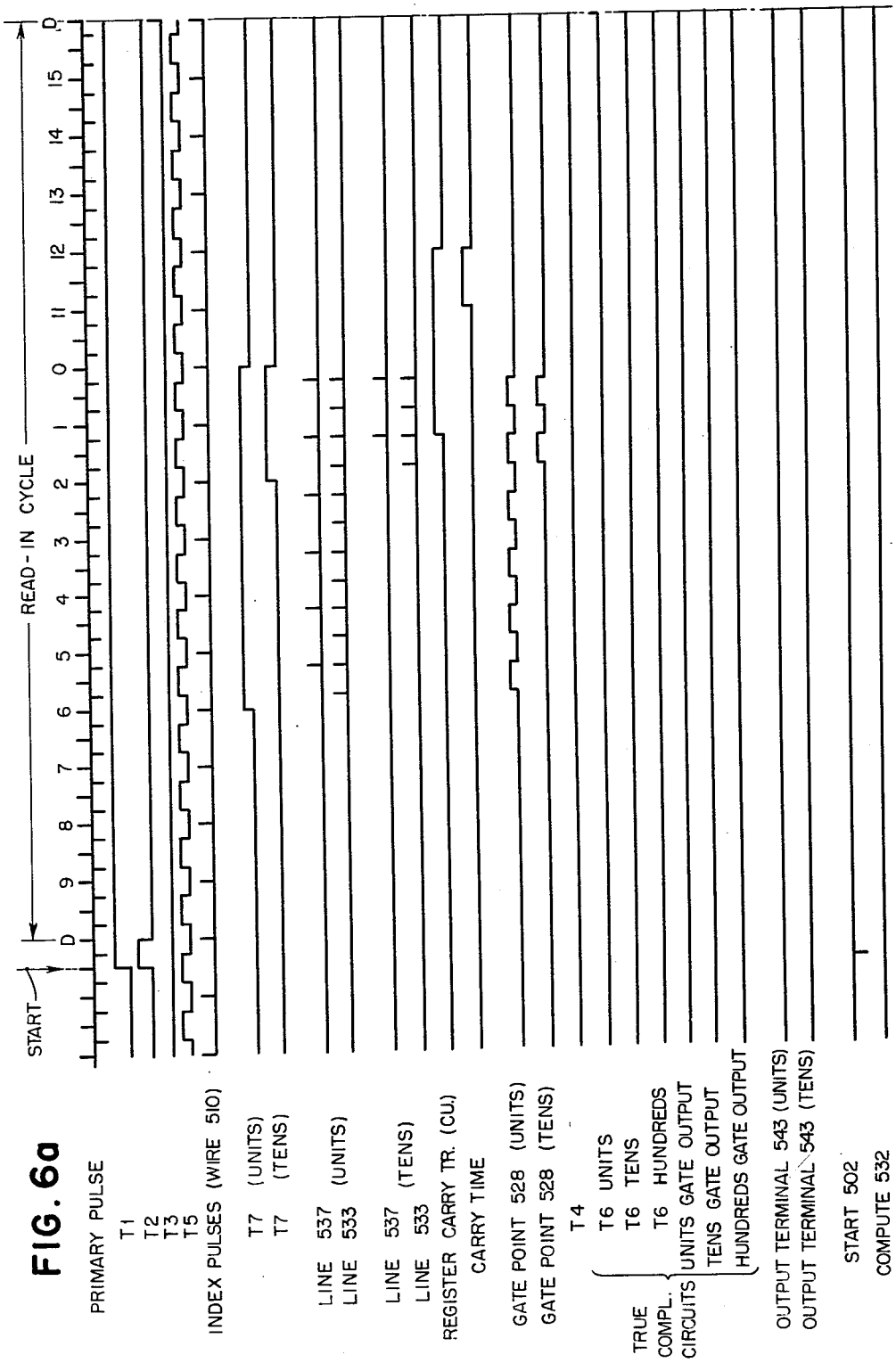

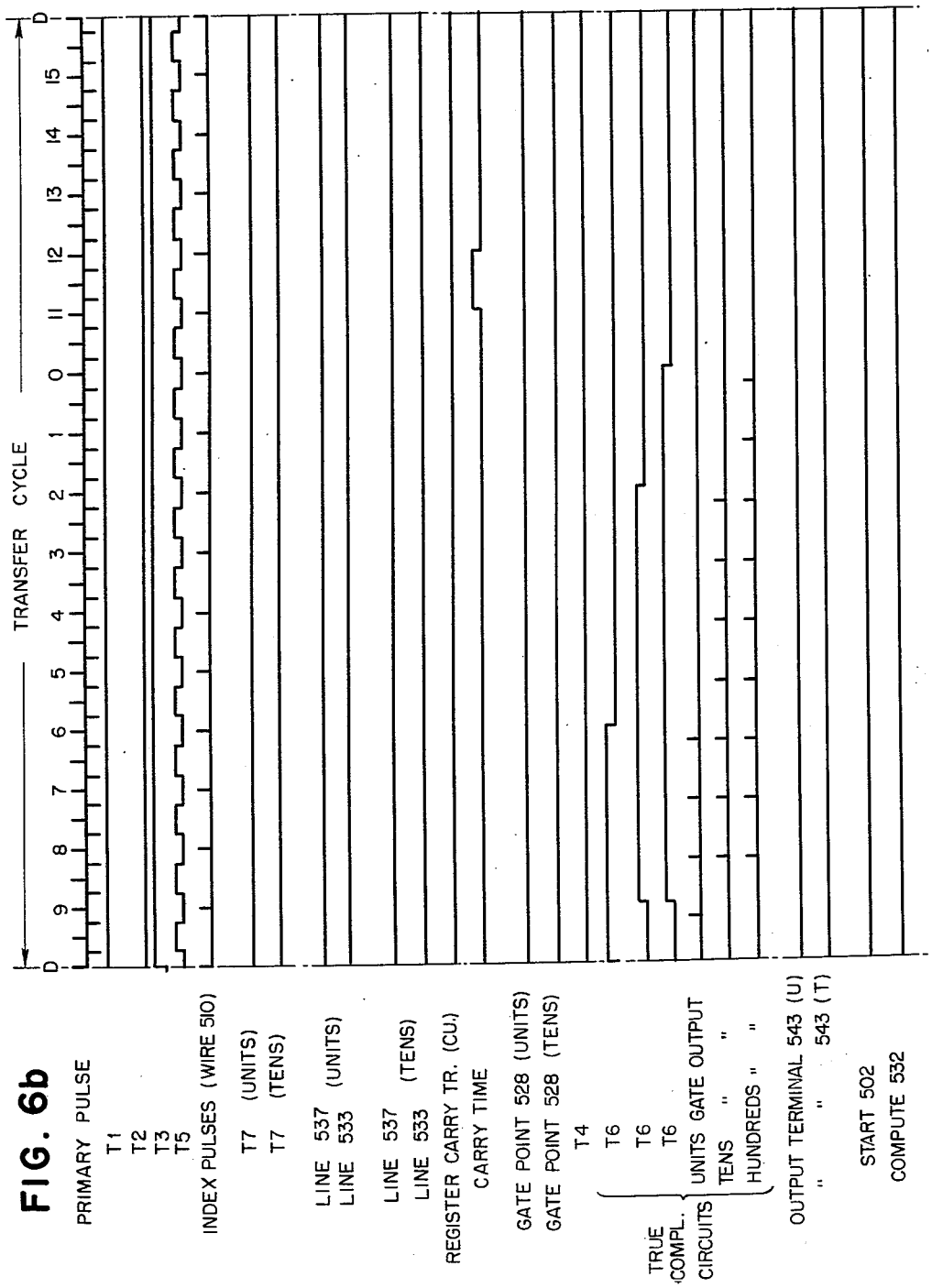

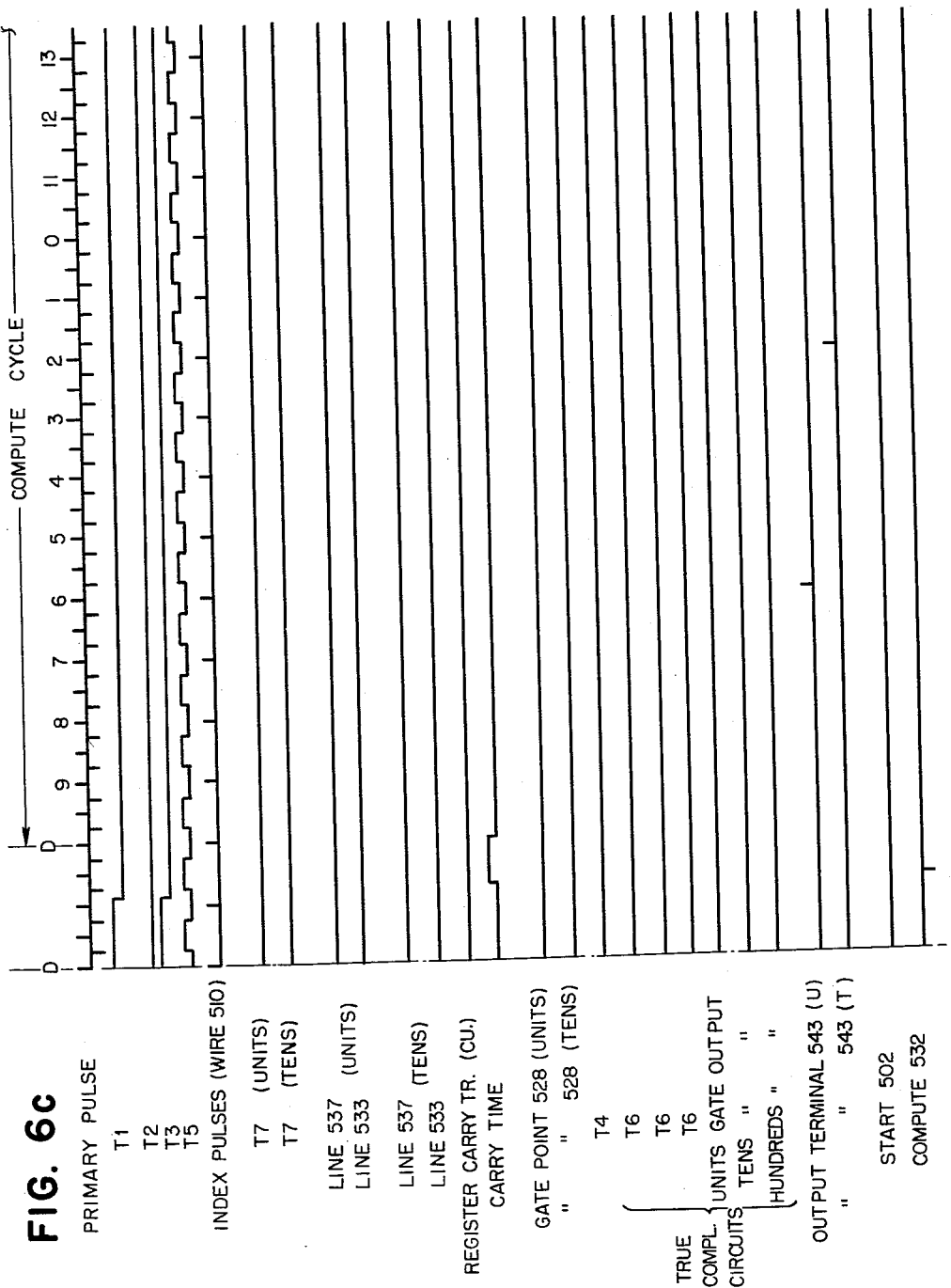

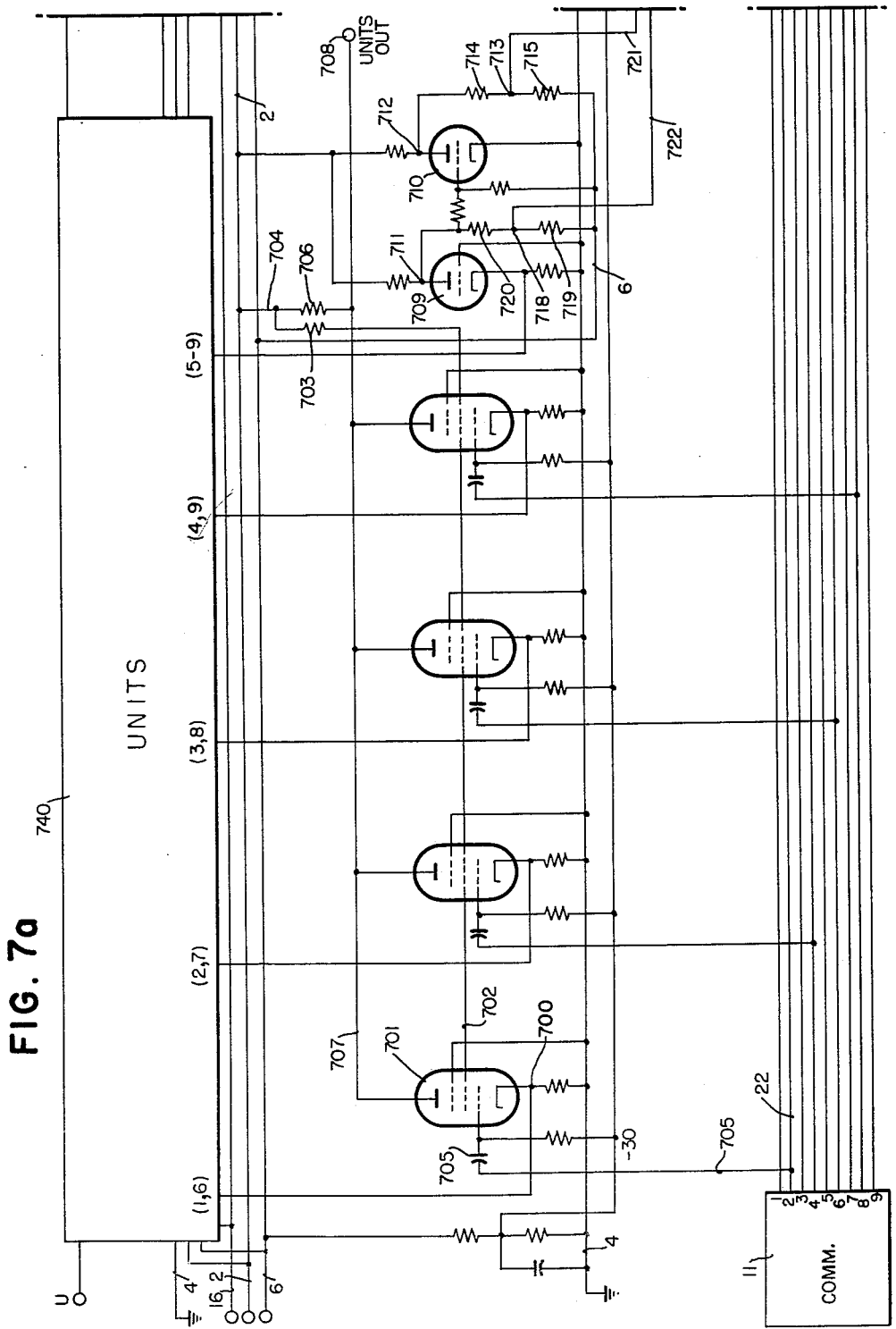

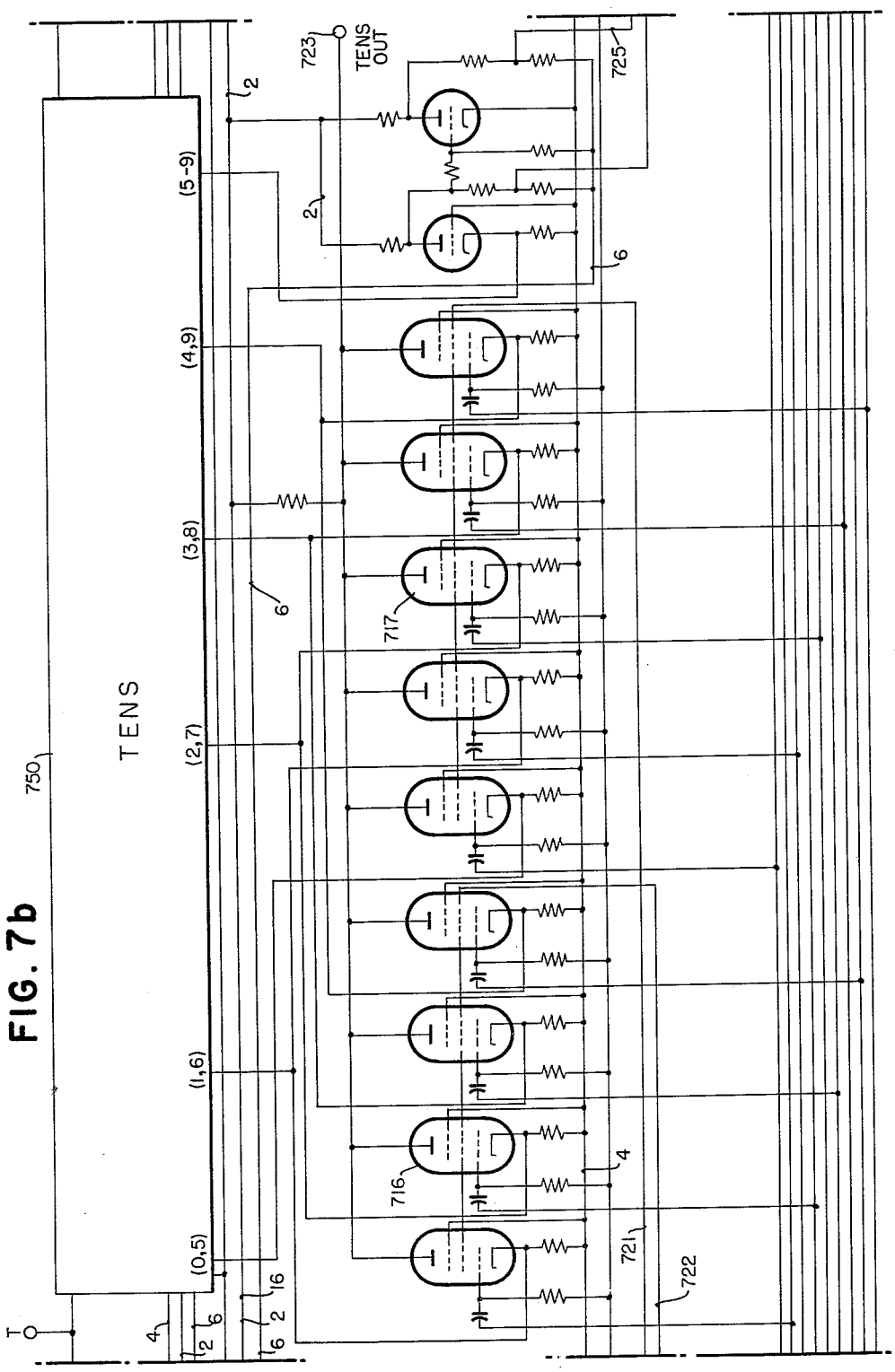

Jan. 2, 1962 A. H. DICKINSON 3,015,442
ELECTRONIC MULTIPLIERS
Filed Dec. 24, 1954 27 Sheets-Sheet 18

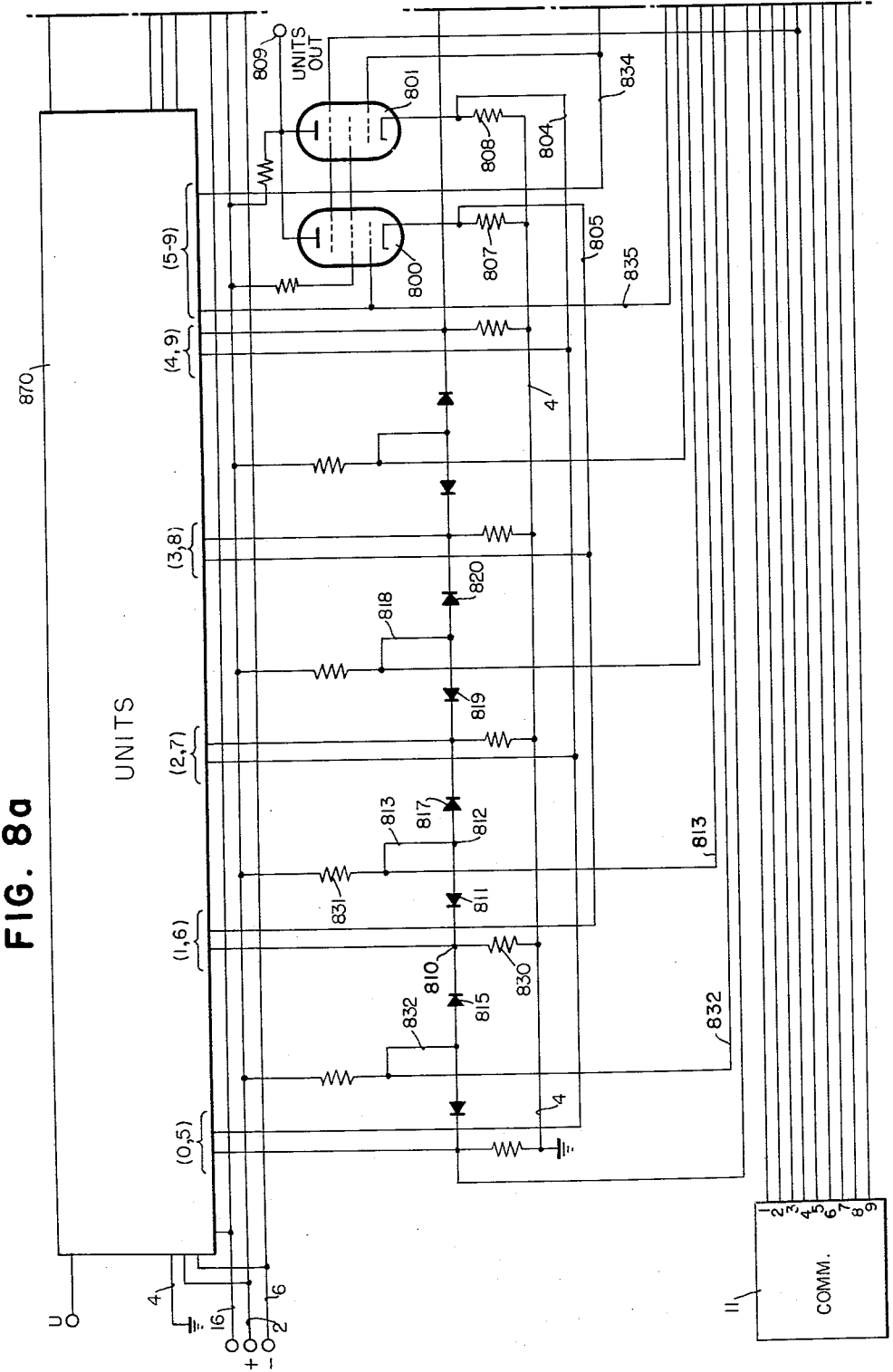

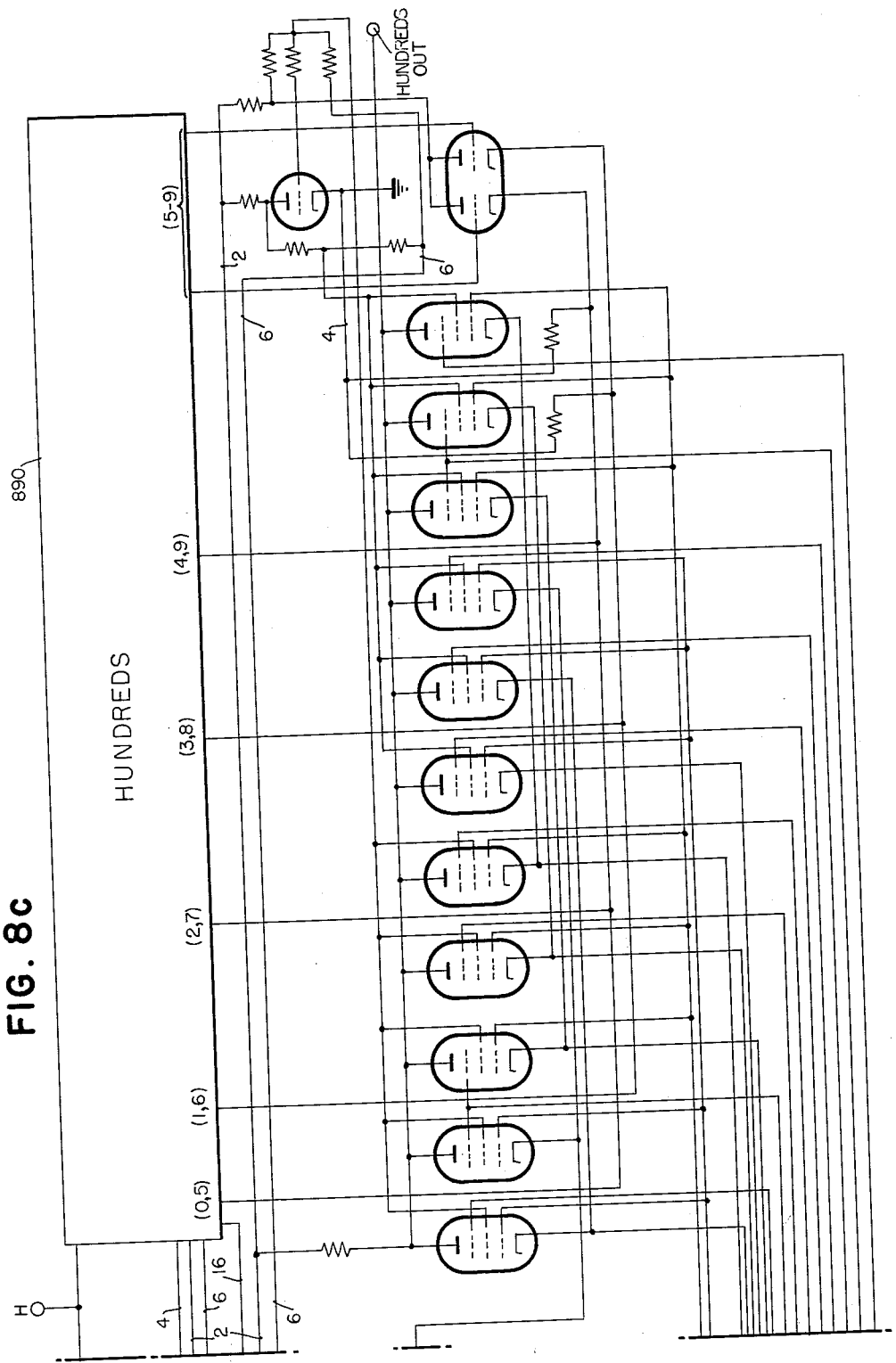

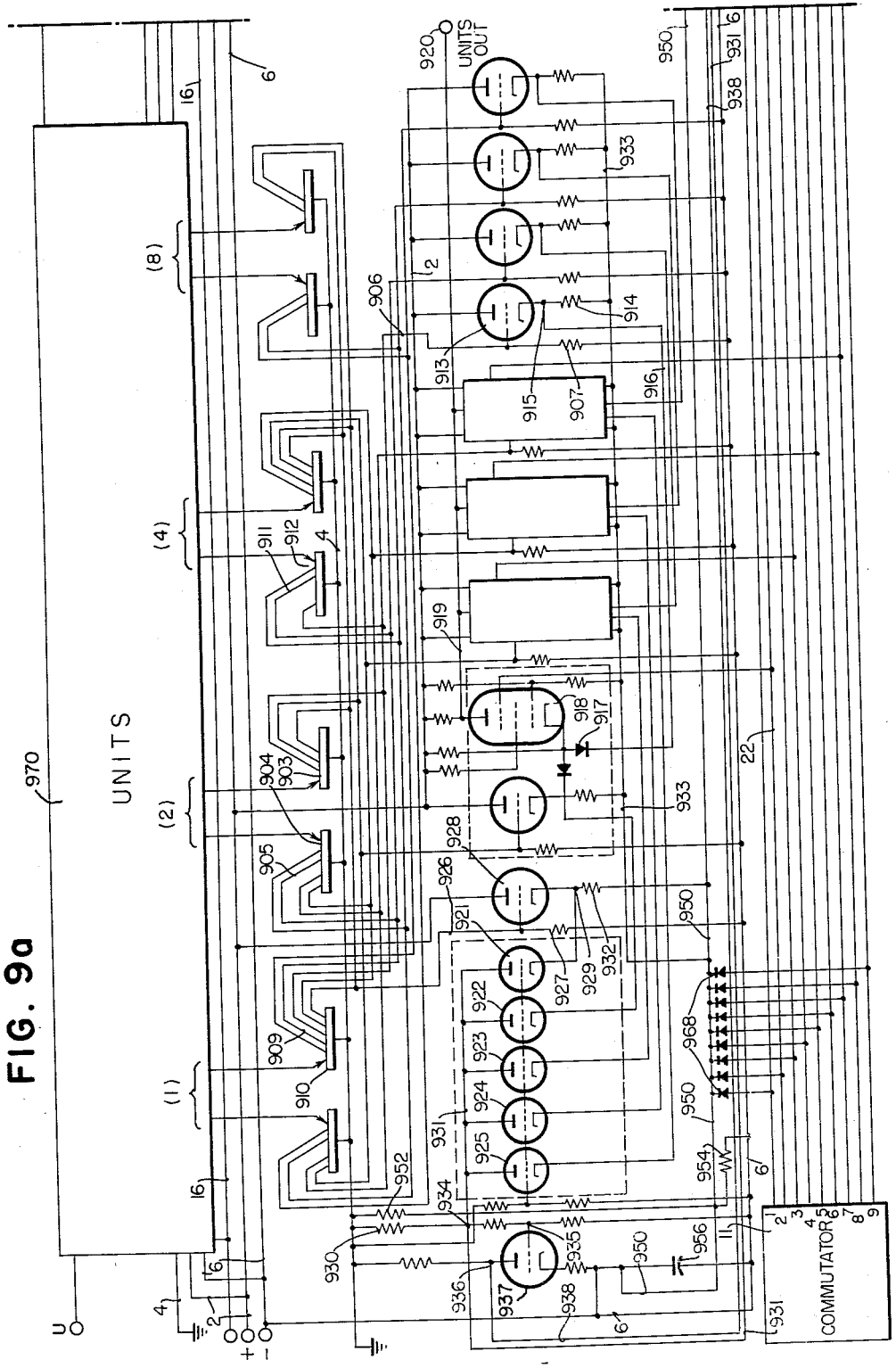

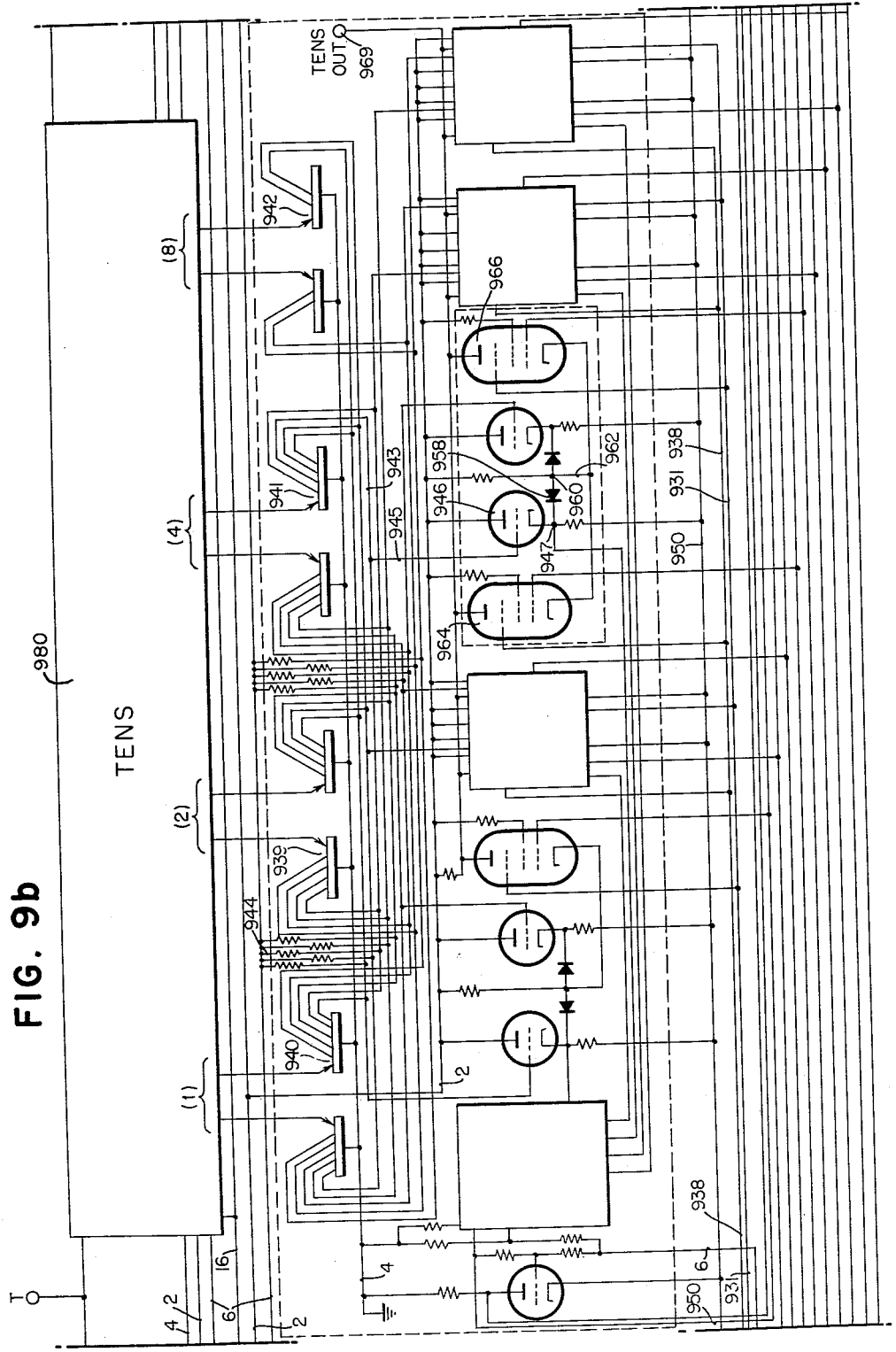

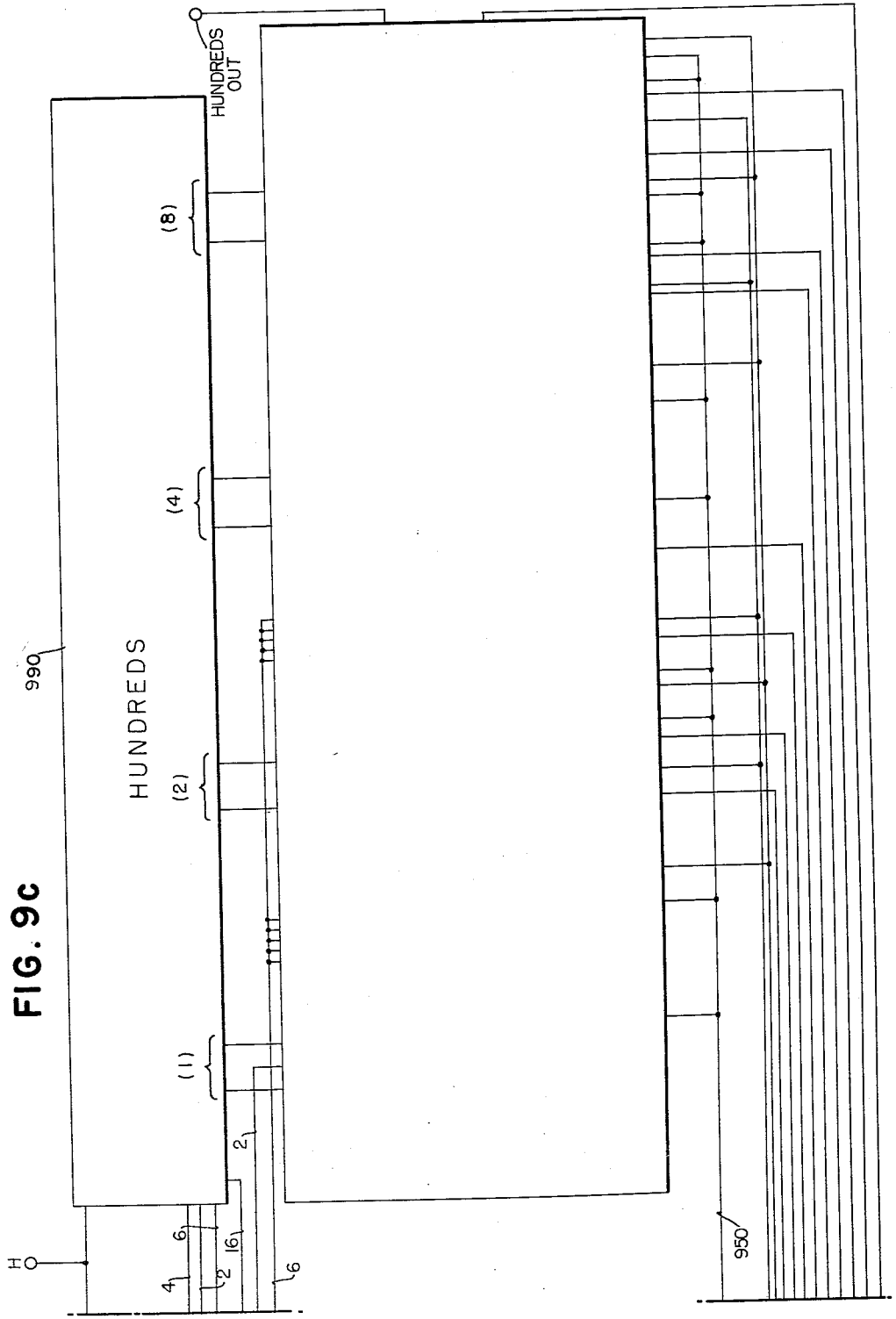

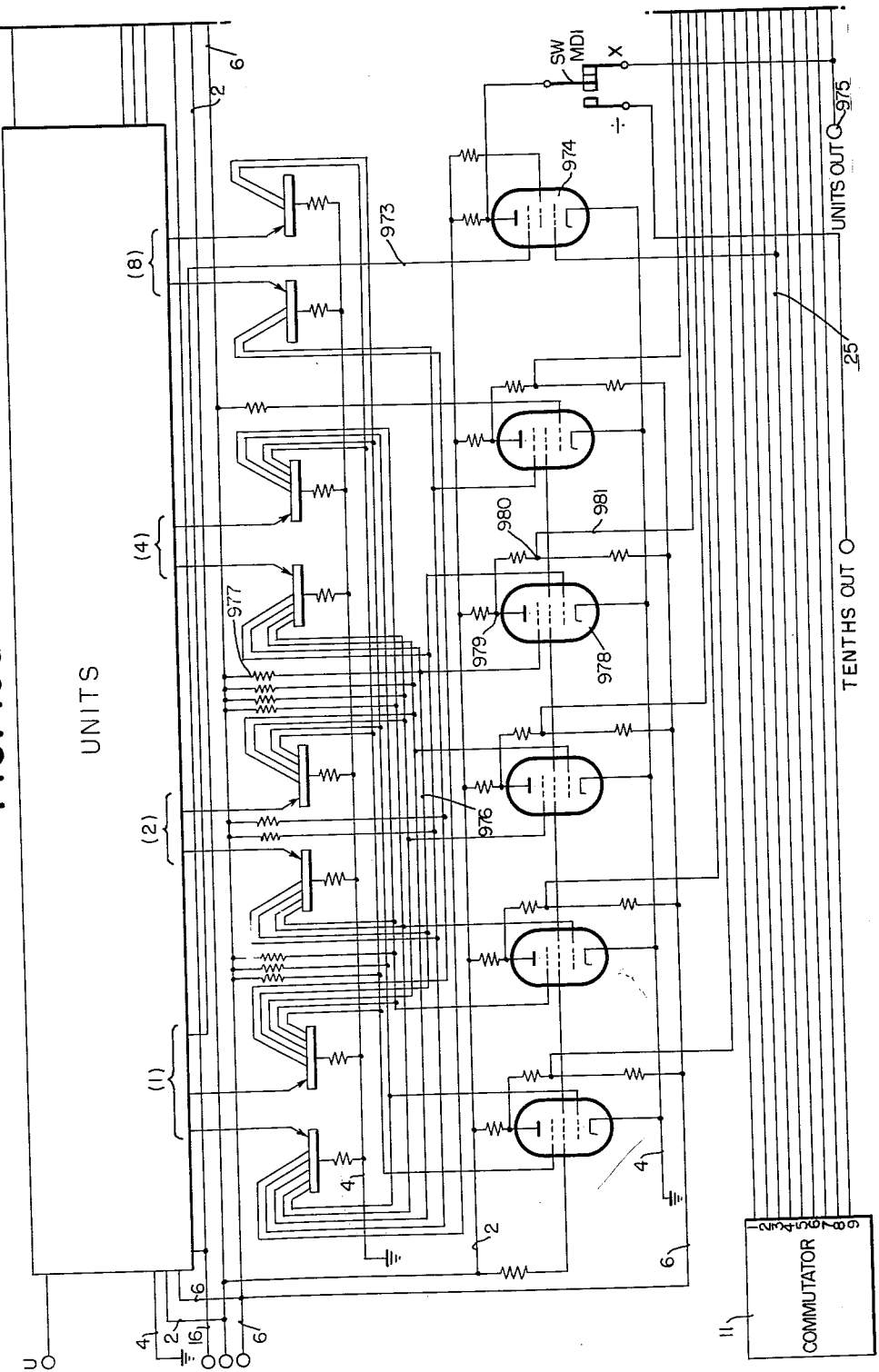

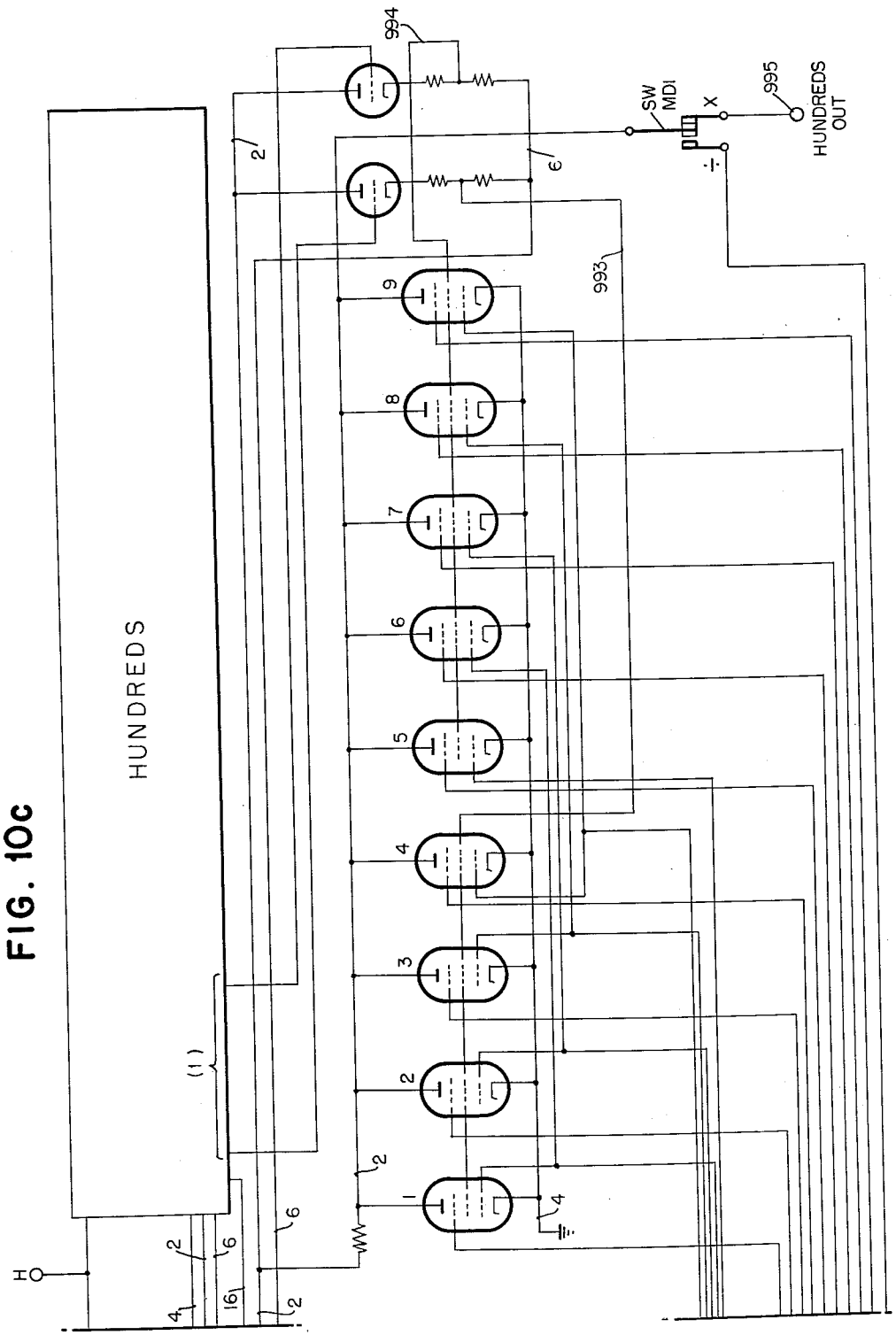

United States Patent Office 3,015,442
Patented Jan. 2, 1962

3,015,442
ELECTRONIC MULTIPLIERS
Arthur H. Dickinson, Greenwich, Conn., assignor to International Business Machines Corporation, New York, N.Y., a corporation of New York
Filed Dec. 24, 1954, Ser. No. 477,507
8 Claims. (Cl. 235—160)

This invention relates to multiplying machines and more specifically to electronic devices adapted for obtaining multiples or submultiples of entered multiplicands. Such devices are especially suited for use in systems in which multiplication is effected by the accumulation of partial products.

Accordingly, a principal object of this invention is the provision of a device into which a first number may be entered and from which may be read a second number having a predetermined proportional relationship to the first number.

Another object is to provide electronic registers from which multiples or submultiples of entered amounts may be read out.

A further object is to provide an arrangement permitting the direct readout of two times the amount entered in the register.

Another object is the provision of an arrangement which enables the direct readout of five times the amount entered in the register.

An additional object is to provide an arrangement which enables the direct readout of a given number divided by two or divided by five.

Still another object of the invention is to provide multiples or submultiples of an amount entered in a register, each order of which represents digits on a coded basis.

A further object is to provide multiples or submultiples of amounts entered in a register, each order of which comprises elements representing digits according to the quinary notation.

Another object is to provide multiples or submultiples of amounts entered in a register, each order of which comprises elements representing digits according to the binary-coded decimal notation.

Other objects and novel features of the invention are pointed out in the following description and claims and illustrated in the accompanying drawings, which disclose, by way of example, the principle of the invention and the best mode, which has been contemplated, of applying that principle.

Where in this specification or the appended claims the expression "proportional" is used to define the relation between two numbers, it is intended to mean that the numbers have a constant ratio to each other. For example, one number might be a multiple or a submultiple of the other number, or the numbers might be integrally related to each other. This connotation is believed to be fully consistent with the ordinary dictionary meaning of the term "proportional."

In the drawings, in which like reference numerals designate like components:

FIGS. 1a–1c, when arranged consecutively from left to right, comprise a circuit diagram, partly in block form, of an arrangement in accordance with the present invention for providing a readout of the entered multiplicand X2, in decimal notation;

FIGS. 2a–2d, when arranged consecutively from left to right, comprise a circuit diagram, partly in block form, of an arrangement in accordance with the present invention for providing a readout of the entered multiplicand X5, in decimal notation;

FIGS. 3a and 3b, when arranged from left to right, comprise a circuit diagram, partly in block form, of an arrangement for providing a readout of the multiplicand X1, in decimal notation;

FIG. 4 is a block diagram of a system, in accordance with the present invention, which provides a readout of multiple components of the multiplicand, from X1 through X9, in decimal notation;

FIGS. 5a–5d illustrate, partly in block form, various components of the system of FIG. 4;

Figure 7C:
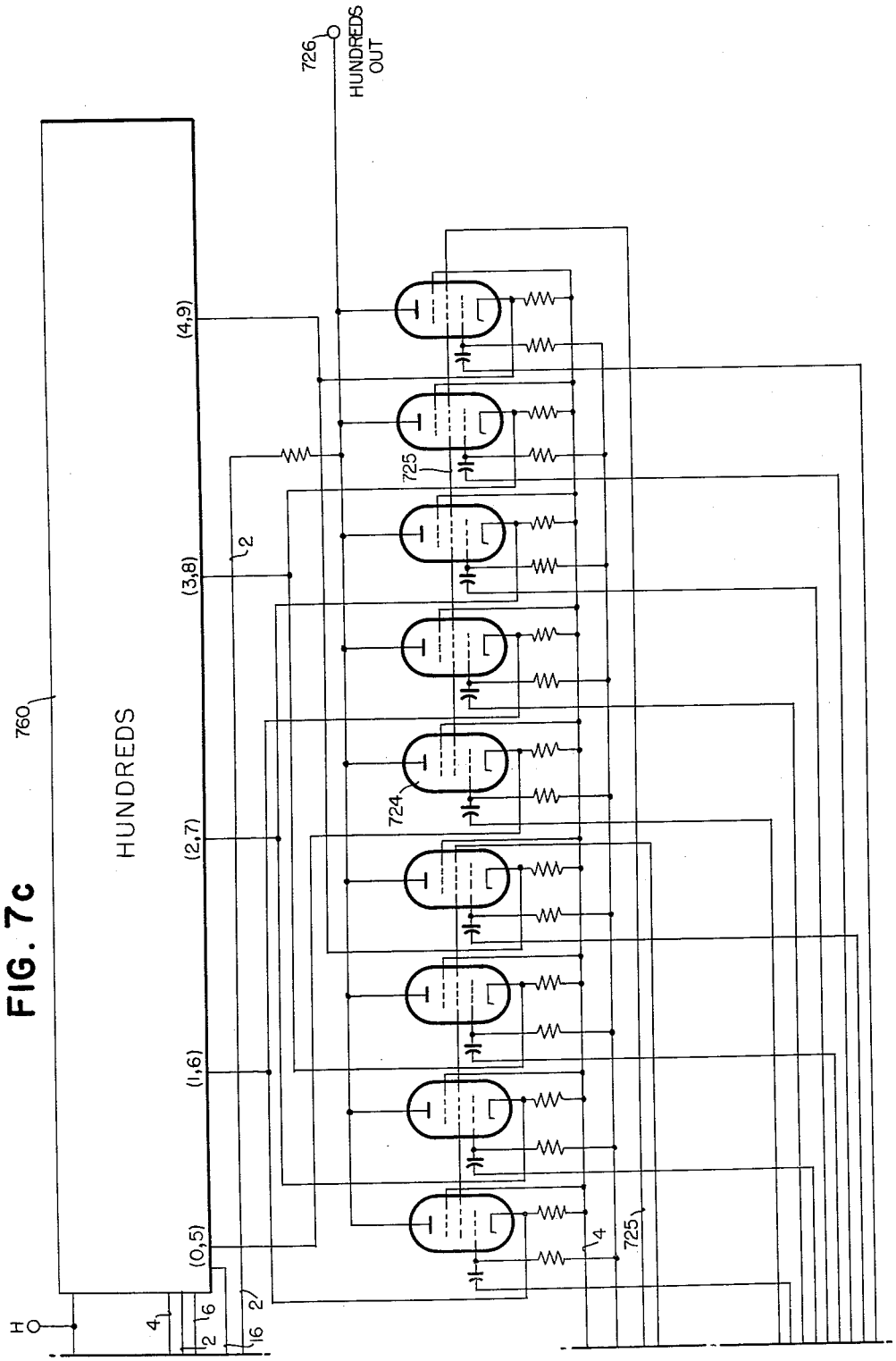
Figure 8B:
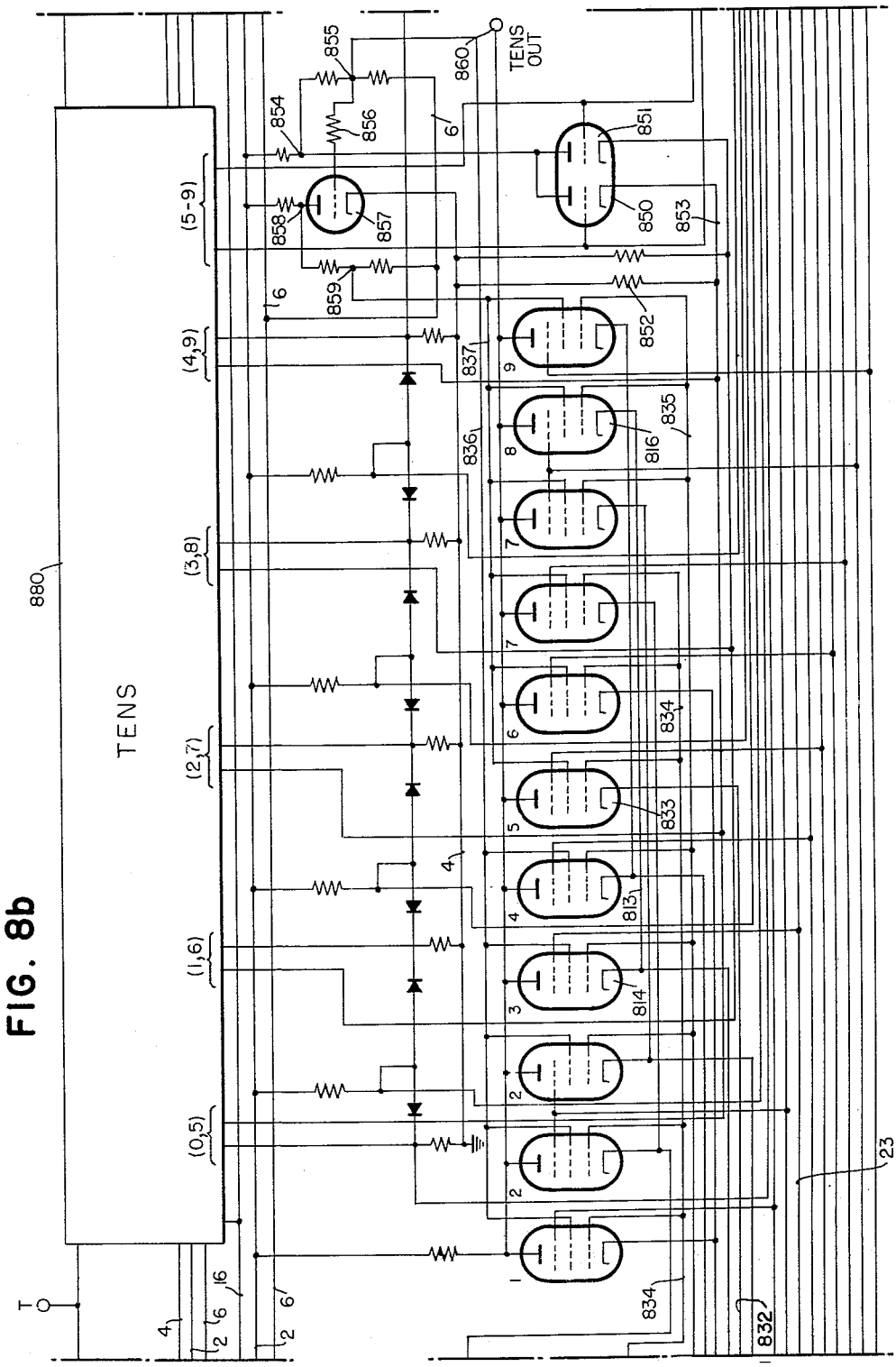
Figure 10B:
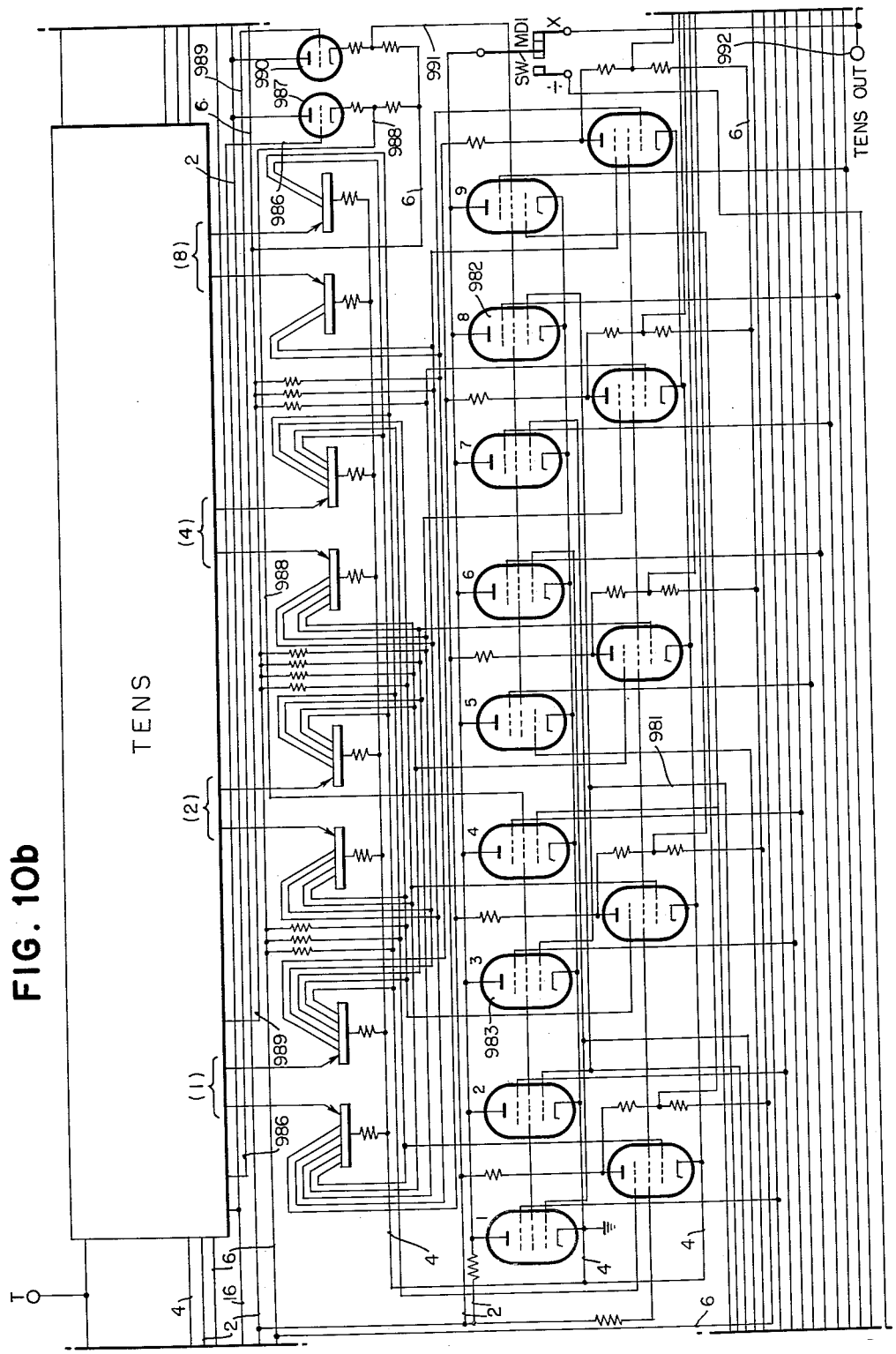

FIGS. 6a–6c comprise a timing diagram graphically indicating the operation of the system of FIG. 4;

FIG. 7a–7c, when arranged consecutively from left to right, comprise a circuit diagram, partly in block form, of an arrangement for providing a readout of the entered multiplicand X2, using a six-digit notation;

FIGS. 8a–8c, when arranged consecutively from left to right, comprise a circuit diagram, partly in block form, of an arrangement for providing a readout of the entered multiplicand X5, using a six-digit notation;

FIGS. 9a–9c, when arranged consecutively from left to right, comprise a circuit diagram, partly in block form, of an arrangement for providing a readout of the entered multiplicand X2, employing binary-coded decimal notation; and FIGS. 10a–10c, when arranged consecutively from left to right, comprise a circuit diagram, partly in block form, of an arrangement for providing a readout of the entered number either multiplied by five or divided by two, employing binary-coded decimal notation.

DECIMAL NOTATION

Multiplicand X2

Referring first to FIGS. 1a–1c of the drawings, there is shown the circuit diagram of an arrangement for providing readout impulses having a numerical value twice that of the multiplicand. The circuits here shown are intended for a multiplicand with a maximum of three digits, but it will be understood that they could readily be expanded to accommodate any desired larger number of digits without departing from the scope of the present invention. The device illustrated comprises a register having three orders represented respectively by the boxes 1, 3 and 5, and conventional carry units 7 and 9 respectively disposed between orders 1 and 3 and orders 3 and 5. Each order comprises ten digit-manifesting elements which are preferably bistable trigger circuits each having an OFF and an ON status. The numerical value of the digit contained in an order is represented by the value of the trigger circuit which is ON in that particular order. For example, a "5" is represented by the ON status of the No. 5 trigger stage, all other trigger circuits being in their OFF status. The orders are preferably arranged and operated in accordance with the disclosure of Dickinson Patent 2,580,741 issued January 1, 1952.

Prior to the initial operation of the device, all the orders are reset to the "0" value. As is well known in this art, this is accomplished by switching all the triggers Nos. 1–9 to the OFF status and by switching the "0" trigger to its ON status. Entry of the multiplicand value may now be made into the three orders of the device. A number of impulses corresponding to the digit value for the units order are applied to input terminal 10. These impulses cause a step-by-step operation of the trigger elements comprising units order 1. If the units digit were to be "5," for example, then five impulses would be supplied to input terminal 10 from any suitable source, as for example a source such as that disclosed in above-mentioned Patent 2,580,741. The units order would then advance in response to these five input pulses, and would stop following receipt of the fifth such pulse. The No.

5 trigger circuit would thus be in its ON status. Impulses to the tens and hundreds orders, respectively designated 3 and 5, are supplied in the same manner to input terminals 12 and 14. Entries into the individual orders may be made concurrently or in successive cycles, as required. Carry units 7 and 9 function only if the total value entered into the preceding order exceeds "9," a situation which does not occur under the type of operation presently being described.

In addition to the pulses representing the multiplicand value, a constant source of pulses is connected to input terminal 16 for the purpose described in above-mentioned Patent 2,580,741. These pulses are OFF pulses used to turn off a lower stage when a higher stage is turned ON as a result of an advancing pulse on one of the input terminals 10, 12 and 14. Thus it will be apparent how, when numbers of impulses representing the multiplicand are applied to input terminals 10, 12 and 14, the value of the multiplicand is established in the orders of the device.

With the multiplicand value thus set up in the register, a start-stop commutator represented by box 11 in FIG. 1a is caused to operate through one cycle. A suitable type of commutator is disclosed in Dickinson Patent 2,461,412 issued February 8, 1949. As a result of such operation, differentially timed impulses are produced on wires 21—29, respectively representing numerical values "1" through "9" and these pulses are applied to circuits associated with and under control of each order, in such a manner that timed impulses which together represent a value of the multiplicand X2 will appear respectively on units output terminal 36, tens output terminal 38 and hundreds output terminal 40, as will now be described.

Through the action of pentode gates 42, 44, 46 and 48, the units digit, appearing at output terminal 36, will have a value corresponding to the doubled value of the multiplicand units digit. For example, if the unit multiplicand digit is "2" the No. 2 stage in the units order will be ON. Accordingly, the right-hand portion of the No. 2 trigger circuit will be conductive, so that a path for current flow will be provided through conductor 52 to the emitter of transistor 54 and extending from the base of transistor 54 through conductor 56 and resistor 58 to ground line 4. Current flow through the emitter-base circuit of transistor 54 increases the collector current flow to such an extent that the potential of junction 60 assumes a value near that of ground line 4.

When the right-hand portion of the No. 2 trigger circuit is nonconductive, that is, when this stage is OFF, there is no current flow through the emitter-base circuit of transistor 54 and therefore relatively low current flow in the collector circuit of this transistor. Under this condition, the potential of junction 60 has a value near that of negative line 6. The suppressor grid of pentode 44 is connected by lead 62 to junction 60, so that during the time that stage No. 2 is OFF pentode gate 44 is maintained closed. However, when stage No. 2 is ON, the current flow through the collector of transistor 54 causes junction 60, and therefore the suppressor grid of pentode 44, to rise to a value near that of ground line 4, as previously explained. Pentode gate 44 is now open and a positive impulse applied to its normally negative control electrode will produce a negative impulse at output terminal 36. The control electrode of this gate is coupled through capacitor 64 and lead 66 to impulse line 24 from commutator unit 11. This impulse line carries a positive impulse at the "4" time during each cycle of operation of the start-stop commutator. Thus it may be seen that for a multiplicand X2 value, a differentially timed impulse representing the value "4" is produced at units output terminal 36.

Since the units output digit must also be "4" when the multiplicand units digit is "7," the device is so arranged that pentode gate 44 is also open when the No. 7 trigger circuit is ON. Conduction of the right-hand portion of this trigger circuit causes the collector current of transistor 55 to increase. Resistor 61 is a common collector load resistor for transistors 54 and 55. Thus when trigger circuit No. 7 is ON, the negative bias on the suppressor grid of pentode 44 is also reduced to such an extent that a "4" output pulse is being produced at output terminal 36. When "2" was doubled to produce a units "4" output, no carry to a higher order was required. However, when "7" is doubled to produce a units "4" output pulse, a carry to the tens order is required. The method of applying the carry to the higher order will be described subsequently.

In the units position, the four pentode gate tubes 42, 44, 46 and 48 are sufficient for controlling the units output pulse produced on output terminal 36, these gates in turn being controlled through transistor operation by the trigger elements in the units order. For any value of the multiplicand in the units order of "1" through "9," the units output will be "0" (no pulse), "2," "4," "6" or "8." To illustrate, if the multiplicand units order stands at "2," the output pulse required on output terminal 36 must have a value of "4." If the units order stands at "7," the units output required at output terminal 36 must also have a value of "4." Any digit, odd or even, when doubled results in an even digit in its units position. It will be apparent, therefore, that in the units order only four gates are sufficient for control of the units output terminal. In the higher orders, however, a total of nine similar gating circuits is required. Whenever a digit in the range "5" to "9" is doubled in one order, the readout from the next higher order must be increased by "1." For example, if there is an entry of "19" into the device the actual amount read out in the form of differentially timed impulses must be "38," the tens column reading being $1 \times 2 + 1 = 3$.

This is provided for by extending the gate control circuit for the tens order to a section in the units order. In the units position, triodes 68 and 70 function to establish potentials on leads 72 and 74. It will be noted that lead 74 extends to the screen grids of those pentodes in the 1, 3, 5, 7 and 9 positions, and that lead 72 extends to the screen grids of those pentodes in the 2, 4, 6 and 8 positions (see FIG. 1b). Accordingly a control, stemming from the units order, governs which group of pentodes shall be operable in the tens order. When the digit in the lower order is in the "0" to "4" range, lead 72 is made high and lead 74 low. When the digit is in the "5" to "9" range, lead 74 is made high and lead 72 low. Anode current can flow only in those pentodes having raised screen potentials. In each group of these pentodes only one suppressor grid is at zero bias, depending upon which trigger circuit is ON. For example, suppose that the No. 1 trigger is ON in the tens order. Current flow through the emitter circuit of transistor 76 raises the potential of lead 78 to a value near that of ground line 4. Thus the suppressor grids of pentodes 80 and 82 are shifted from highly negative to zero bias. All other similar pentodes in this order have their suppressor grids at cutoff potential. The screen grid of either pentode 80 or pentode 82 is raised, depending upon the value of the digit in the units order. If no carry were required, as when the No. 2 trigger circuit is ON in the units order (as for example when the multiplicand is "12"), then the doubled output would be "24." In that case lead 72 would be raised and lead 74 lowered in potential, so that pentode 80 would be rendered conductive to provide a "2" pulse at tens output terminal 38.

On the other hand, when the multiplicand is "19" the required outputs is "38" and the tens order output is no longer "2" but now must be "3." With the No. 9 trigger ON in the units order, lead 74 instead of lead 72 is raised and pentode 82 is rendered conductive, so that for a "1" in the tens order a "3" is read out at tens output terminal 38. Thus it is apparent how the value of a higher order readout pulse is governed by the value contained in the next lower order. The mode of operation of this governing circuit will now be discussed.

By reference to FIG. 1a it will be seen that when a trigger in the group Nos. 0–4 in the units order is ON, representing a digit "0" through "4," the current which flows through its right-hand portion must also flow through resistor 58. A voltage drop is thus produced across resistor 58 such that the cathode of triode 68 becomes positive with respect to ground line 4. The grid of triode 68 is connected to ground line 4. The effect of raising the cathode of triode 68 is to cut off conduction in this tube. The anode of this triode connects by means of wire 84 through resistor 86 to positive line 2. With triode 68 nonconductive, junction 88 is at its highest potential. This junction is connected through voltage divider 90, 92 to negative line 6. A junction 94 on this divider is also at its higher of two values. Lead 72 connects to junction 94 and is therefore also at its higher of two values. When all triggers in the Nos. 0–4 group are OFF no current flows through resistor 58. The grid bias of triode 68 is thus reduced and the triode becomes conductive. The potential of junction 88 is then lowered due to the increased current flow through resistor 86. Junction 94 on voltage divider 90, 92 also becomes less positive and the potential on lead 72 is reduced to that of ground line 4 or slightly below. When no trigger is ON in the Nos. 0–4 group, there must be a trigger ON in the Nos. 5–9 group. Triode 70 operates in the same manner as triode 68 and controls the potential of lead 74. The two triodes 68 and 70 are always in the opposite status, that is, when one is conductive, the other is nonconductive.

To further illustrate the mode of operation a typical example will be worked out, using all three orders of the device. Assume an entry of "319" is made into the device. With such entry the No. 3 trigger in the hundreds order, the No. 1 trigger in the tens order, and the No. 9 trigger in the units order will all be ON. All other triggers will be OFF. During a readout cycle the start-stop commutator is operated through one cycle. Differentially timed pulses corresponding to the values "9" through "1" are applied to the wires 29—21 in that order. The product of 319×2 equals 638, and appears first as an "8" pulse at the units output terminal 36, next a "6" pulse at the hundreds output terminal 40 and, finally, a "3" pulse at the tens output terminal 38. The method for obtaining these output pulses will now be explained.

Consider first the units order. This order has its No. 9 trigger stage ON, so that the right-hand portion of this stage is conductive. Current flows through the emitter-base circuit of transistor 96, through resistor 98 to ground line 4. The cathode of triode 70 is raised in potential, thus cutting off current flow through this triode. The collector of transistor 96 is connected by lead 100 through resistor 102 to negative line 6. Due to the emitter current flow, an increased current flows in the collector circuit of transistor 96. The voltage drop thus produced across resistor 102 is of such polarity that the voltage of the suppressor grid of pentode 48 is made near that of ground line 4. Pentode 48 is thus made potentially conductive. The control electrode of pentode 48 is normally at cutoff, being connected to a negative line 104 through a grid resistor 106. This control electrode is coupled by a capacitor 108 and a lead 110 to "8" impulse line 28 from commutator unit 11. A positive impulse is produced on this line for each cycle of the start-stop commutator. The control electrode of pentode 48 is thus made momentarily positive at the "8" time for each readout cycle. Anode current is thus momentarily produced in pentode 48 resulting in a voltage drop across resistor 112. A negative output pulse at "8" time is thus produced at units output terminal 36.

In the tens order the No. 1 stage is ON, its right-hand portion being conductive so that current flow results through the emitter-base circuit of transistor 76. As before, increased collector current flow raises the potential of lead 78. This wire connects to the suppressor grids of pentodes 80 and 82, thus making them both potentially conductive as far as their suppressor-grid circuits are concerned. Triode 70 in the units order is nonconductive and triode 68 is conductive. The potential of lead 74 is therefore high and that of lead 72 low. Of the two pentodes 80 and 82, only pentode 82 is potentially conductive, since the screen grid of pentode 80 is held too low for possible anode current flow. Of the nine pentodes in this order, only pentode 82 has its screen and suppressor grids both favorably conditioned for anode conduction. The control electrode of pentode 82 connects through resistor 114 to a negative line 105; thus this pentode remains nonconductive. When the commutator operates through its cycle, at "3" time its output line 23 is made momentarily positive. The resultant positive pulse is applied by lead 116 through a capacitor 118 to the control electrode of pentode 82. A momentary conduction of this pentode is thus produced. Anode current flows through resistor 113 which is connected to positive line 2. Thus a negative pulse is produced on tens output terminal 38 at "3" time.

In the hundreds order the No. 3 trigger is ON, so that its right-hand portion is conductive and current flows through the emitter-base path of transistor 120 to ground line 4. The resultant increased collector current flow raises the potential of lead 122 which connects to the suppressor grids of pentodes 124 and 126. Thus both pentodes are made potentially conductive as far as their suppressor grids are concerned. Since the No. 1 trigger circuit of the tens order is ON, current flow through the emitter-base circuit of transistor 76, conductor 128 and resistor 130 to ground line 4 raises the potential of the cathode of triode 132. The grid of this triode is connected to ground line 4, so that this triode becomes nonconductive. Triode 132 controls the potential on lead 134 through a voltage divider network comprising resistors 136, 138 and 140. When triode 132 is nonconductive the potential of lead 134 is high. As was the case in the lower order, a corresponding triode 142 controls the potential of lead 144 and the present potential of this lead is low. Of the two pentodes 124 and 126, pentode 126 is maintained nonconductive due to the low potential on lead 144. Of the nine pentodes in the output circuit of the hundreds order, only pentode 124 has its screen and suppressor grids favorably conditioned for anode conduction. The control electrode of pentode 124 is connected through a resistor 146 to a negative line 147 and this tube is therefore normally held at cutoff. This control electrode is also coupled through a capacitor 148 and lead 149 to line 26 from commutator unit 11. The positive impulse appearing at "6" time on this line causes momentary conduction of pentode 124. The anode of this pentode is connected through a resistor 150 to positive line 2. Thus a negative pulse at "6" time appears at hundreds order output terminal 40.

Since the digit in the hundreds order of this example is less than "5," no carry pulse is required at the thousands output terminal 43. When the value of the multiplicand is such that a trigger of the Nos. 5–9 group in the hundreds order is ON, however, it is necessary that a "1" pulse be produced at thousands output terminal 43. This is accomplished by the operation of triode 37 and pentode gate 41 (see FIG. 1c). When any trigger in the Nos. 5–9 group is ON in the hundreds order, the cathode of triode 37 is raised, thus preventing conduction in this tube. A junction 35 on the voltage divider in the anode circuit of this triode is therefore at the higher of its two values. The control electrode of pentode 41, connected to junction 35 by a lead 33, is thus raised so that the positive pulse applied to its suppressor grid at "1" time in the readout cycle appears as a negative output pulse at thousands output terminal 43. Since the hundreds digit in the example given, however, was less than "5," the control electrode of pentode 41 is biased negatively sufficiently to prevent conduction in this tube. For this reason, no pulse appears on thousands output terminal 43.

The output pulses produced at output terminals 43, 40, 38 and 36 in the example given are respectively "0," "6," "3," "8," this being the product of 319×2. It will be apparent, therefore, that an arrangement has been provided for producing at the output terminals differentially timed pulses which correspond in value to twice the amount originally entered into the device as the multiplicand.

*Multiplicand X5*

FIGS. 2a–2d of the drawings show the circuit diagram of an arrangement for providing readout impulses having a numerical value five times that of the multiplicand. This device, like the multiplicand X2 device just described, comprises a register having three orders respectively designated 1, 3, and 5, and conventional carry units 7 and 9 associated with them. Each order comprises ten digit-manifesting elements each having an OFF and an ON status. When in its ON status, each trigger circuit provides a conductive path to positive line 2. If the amount standing in a particular order is odd, the multiple to be read out in the corresponding column will be an amount of "5" increased by the carry increment, if any, from the next lower order. If the amount standing in a particular order is even, the multiple amount to be read out will be "0" plus the carry increment, if any, from the next lower order. A governing circuit associated with each order determines whether the amount in a particular order is odd or even, and controls selectively the readout from that order in accordance with its odd or even setting. In all but the lowest order, two groups of output pentodes are selectively controlled through their screen-grid circuits in such a manner that the carry increment is added to either "0" or "5" to produce output pulses "1" through "9." In the lowest order the only output pulse required under any circumstances is a "5" pulse, "0" being represented by the absence of all pulses.

Since no carry increment is ever applied to the units order in this device, it is necessary only to determine whether the amount standing in this order is odd or even. Whenever the No. "0" stage of the units order is in its ON condition, a current path is provided through the emitter-base path of transistor 152, conductor 154, and resistor 156 to ground line 4. In a similar manner, when each of the remaining even-numbered stages, Nos. 2, 4, 6 and 8, is in its ON status, a conductive path is provided through the associated transistor to lead 154. Thus a voltage drop across resistor 156 is produced when any even number is present in the units order. The cathode of pentode gate tube 158 is also connected to lead 154, and its control electrode is connected to ground line 4. The screen grid of this tube is connected to positive line 2 through a current-limiting resistor 160. The suppressor grid is connected to junction 161 of resistors 162 and 164, which form a voltage divider between ground line 4 and negative line 6, so that this grid is normally held negative with respect to ground. The anode of tube 158 connects through resistor 166 to positive line 2, and this anode is also connected to units output terminal 168. When any even stage in the units order is ON, the voltage drop across resistor 156 raises the cathode of pentode 158 to such an extent that this tube is cut off, with the result that no output pulse is produced at output terminal 168.

When an odd number is contained in the units order, none of the even-numbered stages is ON; therefore no current flows through resistor 156 and the cathode of tube 158 accordingly decreases in potential to a value near that of ground line 4. This reduces the effective grid-cathode bias to a value such that conduction is possible. The suppressor grid is still at a negative potential so that anode current remains cut off. The suppressor grid is also coupled through a capacitor 174 and a lead 176 to output line 25 of commutator unit 11, this line being made positive once each cycle of the start-stop commutator at "5" time. The suppressor grid of pentode 158 is thus momentarily raised in potential at "5" time in the readout cycle, producing a negative pulse at units output terminal 168.

A similar odd-even determining circuit with some modifications is used in each of the higher orders. In the tens order when any even stage is ON, a voltage drop is produced across resistor 178, thus causing triode 180 to become nonconductive. The potential of lead 182, which extends to the screen grids of the four pentodes in the Nos. 1–4 group, is therefore at the higher of its two values. When an even stage is ON, all odd stages must be OFF. No voltage drop is then produced across resistor 184, since no conductive path is provided by the trigger circuit of an odd stage. Triode 186 is therefore conductive and lead 188, connected to a point on the voltage divider in its anode circuit, is low. This lead extends to the screen grids of the pentodes in the Nos. 5–9 group. Thus when an even amount is in the tens order, lead 182 is high and lead 188 is low. When an odd amount exists in the tens order, on the other hand, the status of leads 182 and 188 is reversed. A similar odd-even determining circuit is provided for the hundreds order, utilizing triodes 216 and 228.

To more clearly illustrate the operation on the device, let it be supposed that a multiplicand of 125 is set up in the device. With this entry, the No. 1 stage in the hundreds order, the No. 2 stage in the tens order, and the No. 5 stage in the units order will all be ON. All other trigger circuits will be OFF. During a readout cycle the product of 125×5 will appear as differentially timed impulses on the first three output terminals of the device, respectively designated 168, 170 and 172. The product 125×5 is equal to 625, and the output pulses will appear as follows: A "6" pulse on the hundreds output line 172, a "5" pulse on the units output line 168, and a "2" pulse on the tens output line 170. The operation of the circuits employed to produce this result will now be explained.

Consider first the units order. This order has its No. 5 stage ON and all other stages OFF. Thus no voltage drop is produced across resistor 156 and, as previously described, pentode gate 158 remains open, so that at "5" time a negative impulse is produced at units output terminal 168.

In the tens order stage No. 2 is ON and all other stages are OFF. A path is therefore provided for the flow of current through the emitter-base path of transistor 190 and conductor 192 through resistor 178 to ground line 4. The cathode of triode 180 is thus raised so that this tube is cut off. The potential of lead 182 is therefore raised. At the same time, the potential of lead 188 is low. The pentodes in the Nos. 1–4 group are thus made potentially conductive as far as their screen grids are concerned, while the pentodes in the Nos. 5–9 group are held at cut off. It will be recalled that stage No. 5 in the units order is ON, thus providing a conductive path through the emitter-base path of transistor 194. The collector of this transistor connects to negative line 6 through a resistor 196. The emitter current flow through transistor 194 causes increased collector current flow through resistor 196, thus raising the potential of junction 198 to a value near that of ground line 4. Junction 198 is connected by means of lead 200 to the control electrodes of pentodes 202 and 204 (see FIG. 2b). Junction 198 is the only such point now at elevated potential. All other such points, as for example junction 206, are at potentials near that of negative line 6, since there is no emitter current flow in either of the transistors having their collectors connected to this junction.

Of all the output pentode gates in the tens order, only pentodes 202 and 204 have their control electrodes conditioned favorably for conduction. Of pentodes 202 and 204, only pentode 202 has its screen grid favorably conditioned for conduction. Thus of all the pentodes in the two groups it is only pentode 202 which is open, all the others being closed. The control electrodes of all the pentodes are connected to a negative line 207, as for example by a resistor 209 associated with tube 202, and anode current is thereby normally held cut off. During a readout cycle the control electrodes are positively impulsed sequentially. At "2" time a positive pulse on lead 208 is applied through a capacitor 210 to the control electrode of pentode 202. The resulting anode current flow produces a negative output pulse at "2" time at tens output terminal 170.

In the hundreds order the No. 1 stage is ON, so that current flows through conductor 212 and resistor 214 to ground line 4. The voltage drop across resistor 214 raises the cathode potential of triode 216, thus cutting off conduction in this tube. The anode of triode 216 is connected by means of lead 217 and resistor 218 to positive line 2. When triode 216 is non-conductive, current flow through resistor 218 is at the lower of two values. A voltage divider 220, 222 is connected between lead 217 and negative line 6. A lead 224 is connected to junction 223 of resistors 220 and 222. When triode 216 is nonconductive, as is now the case, the potential on lead 224 is high. Since no even-numbered stage in this order is ON, there is no current flow through conductor 225 and through resistor 226 to ground line 4. Triode 228 is therefore conductive and the potential of lead 230 is negative with respect to ground line 4. Leads 230 and 224 in the hundreds order function in the same manner as leads 182 and 188 in the tens order, to control the conductivity of respective groups of pentode gates.

It will be recalled that stage No. 2 is ON in the tens order. The resultant emitter current flow through transistor 190 causes increased collector current flow in this transistor, the latter current flowing through resistor 232 to negative line 6. The increased current flow through resistor 232 causes junction 234 to be raised in potential to a value near or slightly above that of ground line 4. Junction 234 is connected by lead 236 to the suppressor grids of pentodes 238 and 240. These two pentodes are thus made potentially conductive as far as their suppressor grids are concerned. Since the amount contained in the hundreds order is odd, the potential of lead 230 and the screen grid of pentode 238 is low so that conduction through this pentode is not possible. The potential of lead 224 and the screen grid of pentode 240 is high, thus making this pentode potentially conductive. In the hundreds order, then, it is only pentode 240 which is favorably conditioned to respond to a positive impulse on its control electrode which is applied at "6" time from commutator unit 11, resulting in an output pulse at "6" time on hundreds output terminal 172.

In the example under consideration, no carry to the thousands order is required. No pulse is therefore produced at thousands order output terminal 173. If the digit entered in the hundreds order is "2" or greater, however, carry amounts from "1" to "4" would be required, since carries from the hundreds order in the multiplicand X5 register are 1, 2, 3 or 4 only. Four output gates are therefore sufficient for the thousands order output line, pentodes 242, 244, 246 and 248 serving this purpose. For example, if the hundreds digit were either "6" or "7," a carry of "3" on the thousands output line would be required. With either of stages Nos. 6 and 7 in the hundreds order ON, emitter current flows through the associated one of transistors 250 and 252, thus causing the potential of junction 254 to rise. This reduces the negative bias on the suppressor grid of pentode 246. The screen grid of this tube is connected to positive line 2 by a lead 258 through a resistor 260. The control electrode of tube 246 is connected by a lead 262 to the control electrode of pentode 264 and through a resistor 266 to a negative line 207. The positive pulse occurring at "3" time appears on lead 23, and is applied through a capacitor 270 to the upper terminal of resistor 266. This positive pulse causes momentary conduction of pentode 246 at "3" time, thus producing a negative output pulse at thousands output terminal 173. It will be apparent, therefore, that an arrangement has been provided for producing at the output terminals differentially timed pulses which correspond in value to five times the amount originally entered into the device as the multiplicand.

*Multiplicand X1*

The device of FIGS. 3a–3b provides readout impulses having the same numerical value as the multiplicand, that is, the multiplicand X1. Like the devices previously described, this device comprises a register having three orders respectively designated 1, 3 and 5, together with associated carry units 7 and 9. Each order comprises ten digit-manifesting elements each having an OFF and an ON status. A pentode gate tube is associated with each trigger stage, as shown in detail in connection with the units order. The suppressor grid of each pentode is connected to a point in the associated trigger stage which is high in potential when the trigger is ON and low when the trigger is OFF.

Let it be assumed, for example, that a "5" has been entered in the units order. Accordingly, the No. 5 trigger stage in this order will be ON and all other stages OFF. Lead 282 will therefore be at the higher of its two voltage conditions. This lead is connected to the suppressor grid of pentode 284. The screen grid of this tube is connected by lead 286, resistor 288 and lead 290 to positive line 2. The control electrode of tube 284 is normally maintained sufficiently negative to prevent conduction of this tube. This control electrode is coupled by a capacitor 291 and a lead 292 to impulse line 25 from commutator unit 11. At "5" time during a commutator cycle, line 25 is momentarily positive, thus making the control electrode of pentode 284 positive and rendering this tube momentarily conductive. While it is true that the control electrodes of the remaining pentodes are also sequentially impulsed during a commutator cycle, anode current flow in these other tubes is prevented by the negative voltage on their suppressor grids. Thus it is only the particular pentode which is associated with the single ON trigger stage that will respond to the positive impulse from the commutator unit during a readout cycle. In the particular example being considered, therefore, a differentially timed negative-going output pulse will appear, at "5" time, at units output terminal 294.

The connections for all the other stages in each order are similar, and all three orders are identical. Each pentode gate has its suppressor grid connected to a suitable point in the associated trigger stage. The control electrode of each pentode is coupled to the commutator output line on which appears the differentially timed pulse corresponding in value to that of the associated trigger stage. During readout cycles output pulses representing values corresponding to the multiplicand times one will appear at output terminals 294, 296 and 298.

The governing section required in each of the two previously described devices is not needed in this device. The output gates associated with each order function solely to produce an output pulse representing the value contained in that order. Under no circumstances does the readout from one order rely on amounts contained in an adjacent order, as was the case in the multiplicand X2 and X5 devices. It will also be readily apparent that a separate register is not required for the multiplicand X1 device, since the necessary readout gates could equally well be connected to the registers used for the multiplicand X2 and X5 without difficulty. A separate register is shown in FIGS. 3a–3b only to simplify the description of the operation of the device. It will be understood, however, that a plurality of numbers, each having a predetermined proportional relationship to the number entered in the register, may readily be obtained from a single register in the manner just described. This is an important feature of the present invention.

Carry

In general, carry from a lower order to a higher order of a register may or may not be required. By way of illustration, how carry is accomplished will now be described in connection with the device of FIGS. 3a–3b. Let it be assumed that a "9" has been entered in the units order of the counter during a previous machine cycle. During the next machine cycle a "1" is to be added into the same order for a total of "10." It is apparent that a carry to the tens order of the register is required. When a carry condition occurs during any machine cycle, a carry storage trigger circuit is switched ON and the actual addition of the carry impulse to the higher order is delayed until near the end of the machine cycle. This is done to prevent conflict of the carry pulse with possible entry impulses applied to input terminals 10, 12 and 14.

As an order of the register advances from "9" to "0," a carry pulse to the next higher order is required. In the example under consideration, therefore, a negative-going pulse is developed on lead 402 when the No. 0 stage in the units order switches ON ("9"+"1"="0"+carry). This pulse is applied by a capacitor 404 to a junction 406 of carry trigger unit 7. As a result, carry trigger unit 7 switches ON, causing junction 406 to assume a negative potential with respect to ground line 4. Junction 406 is connected by lead 407 to the grid of triode 408 and this triode is thus made nonconductive. Triode 410 remains conductive, however, since the potential of lead 411 is high. Junction 412 is held at a low potential through conduction of tube 410 in spite of the fact that triode 410 is nonconductive. At a later time in the machine cycle the potential of lead 411 is reduced sufficiently to cut off tube 410, so that the potential of junction 412 rises sharply. This positive-going pulse is applied by a lead 414, a capacitor 416 and a lead 418 to tens order input terminal 12, thereby causing the amount standing in this order to be increased by "1."

If the amount already in the tens order were "9," the addition of the carry pulse to this order would have switched ON the No. 0 trigger stage of the tens order, which in turn would have switched ON carry tens trigger unit 9 and subsequently a carry pulse would have been supplied to hundreds order input terminal 14. It will be apparent, therefore, that the carry pulse control voltage on lead 411 must be of sufficient duration to permit all of the carry-on carry pulses to operate as just described. Each carry-on carry pulse is necessarily delayed several microseconds by the switch-over time of the trigger stages.

Multiplicand X1 through X9

FIG. 4 of the drawings shows a system which provides a readout of multiple components of the multiplicand, from X1 through X9. The system employs readout circuits of the type described above in connection with FIGS. 1, 2 and 3. The particular arrangement of FIG. 4 is intended for multiplicands having no more than two digits. It will be apparent that the system may readily be expanded, without departing from the scope of the present invention, to accommodate larger multiplicands. As indicated by the parenthetical figure numbers, the details of certain portions of the system of FIG. 4 are illustrated in FIGS. 5a–5d.

The system of FIG. 4 comprises an electronic commutator unit 11; five electronic registers, designated A, B, C, D and E, each of which controls either one, two or three readout devices 401; a secondary pulse source, compute control and sequence control unit 402; an input control unit 403; a group of transfer gates collectively designated 404; and a group of output gates 405. Commutator unit 11 is preferably of the type disclosed in the above-mentioned Patent 2,461,412, and has a number of progressively operated trigger stages and a control unit. The control unit is designated D and the stepping units are designated 9, 8, 7, 6, 5, 4,3, 2, 1, 0, 11, 12, 13, 14 and 15 (see FIGS. 6a–6c). A machine cycle of 16 points is employed in this illustrative embodiment, and the commutator steps through one cycle for each machine cycle.

Register A has X1, X2 and X5 readout devices associated with it. Register B controls X1 and X2 readout devices, as does register C. Registers D and E each control a single X1 readout device. All the readout devices are preferably of the types described above in connection with FIGS. 1–3, and they are supplied with differentially timed pulses by means of cable 406 from commutator unit 11. The registers are preferably of the type disclosed in above-mentioned Patent 2,580,741, or the equivalent.

Operation of the system will be better understood by reference to the timing diagram of FIGS. 6a–6c. Primary pulses from a suitable source (not shown) are applied to a terminal 430, these pulses being alternately occurring positive and negative pulses as illustrated in FIGS. 6a–6c. A complete computation requires three cycles of operation of commutator unit 11. The first cycle is called the "Read-in" cycle; the second cycle a "Transfer" cycle; and the third cycle a "Compute" cycle. A read-in cycle is initiated by applying a control pulse, derived from associated equipment (not shown), to terminal 502. The sequence control of unit 402 initiates a first cycle of operation of commutator unit 11. During the read-in cycle differentially timed pulses representing the value of the multiplicand are applied to terminals 501 and 500. For example, if the multiplicand value is "32," pulses will be applied to terminals 501 and 500 at the "3" time and at the "2" time, respectively. These differentially timed pulses open gates in input control unit 403 in such a manner that series of pulses are produced on lines 533 and 537, these pulses being added in their respective orders of registers A, B, C, D and E. The input control gates are of two types. One type provides three pulses in response to a differentially timed "3" input pulse, for example, and the other two provides six pulses in response to the same input pulse. Thus during the read-in cycle, pulses equal in number to the multiplicand and to twice the value of the multiplicand are available as inputs to the registers.

The input control gates are so connected to the registers by lines 537 (X1) and 533 (X2) that registers A and B are supplied with the multiplicand X1 pulses and registers C and D with the multiplicand X2 pulses. Line 537 is connected to register E in such a manner that a "column-shifted" or X10 entry results. Thus at the end of the read-in cycle, registers A, B, C, D and E stand respectively at the multiplicand X1, X1, X2, X2 and X10. Automatically at the end of the read-in cycle, a transfer cycle is started.

During the transfer cycle, the value standing in register A is analyzed, and differentially timed pulses corresponding to the values of the multiplicand X1, X2, and X5 are developed in the associated readouts 401. These pulses control transfer gates 404 to provide a second series of pulses for entry into the registers. Specifically, they provide multiplicand X2 and X5 and the complement of the multiplicand. The transfer gates are open only during the transfer cycle. This control is realized by line 573 from the sequence control of unit 402.

Figure 2B:
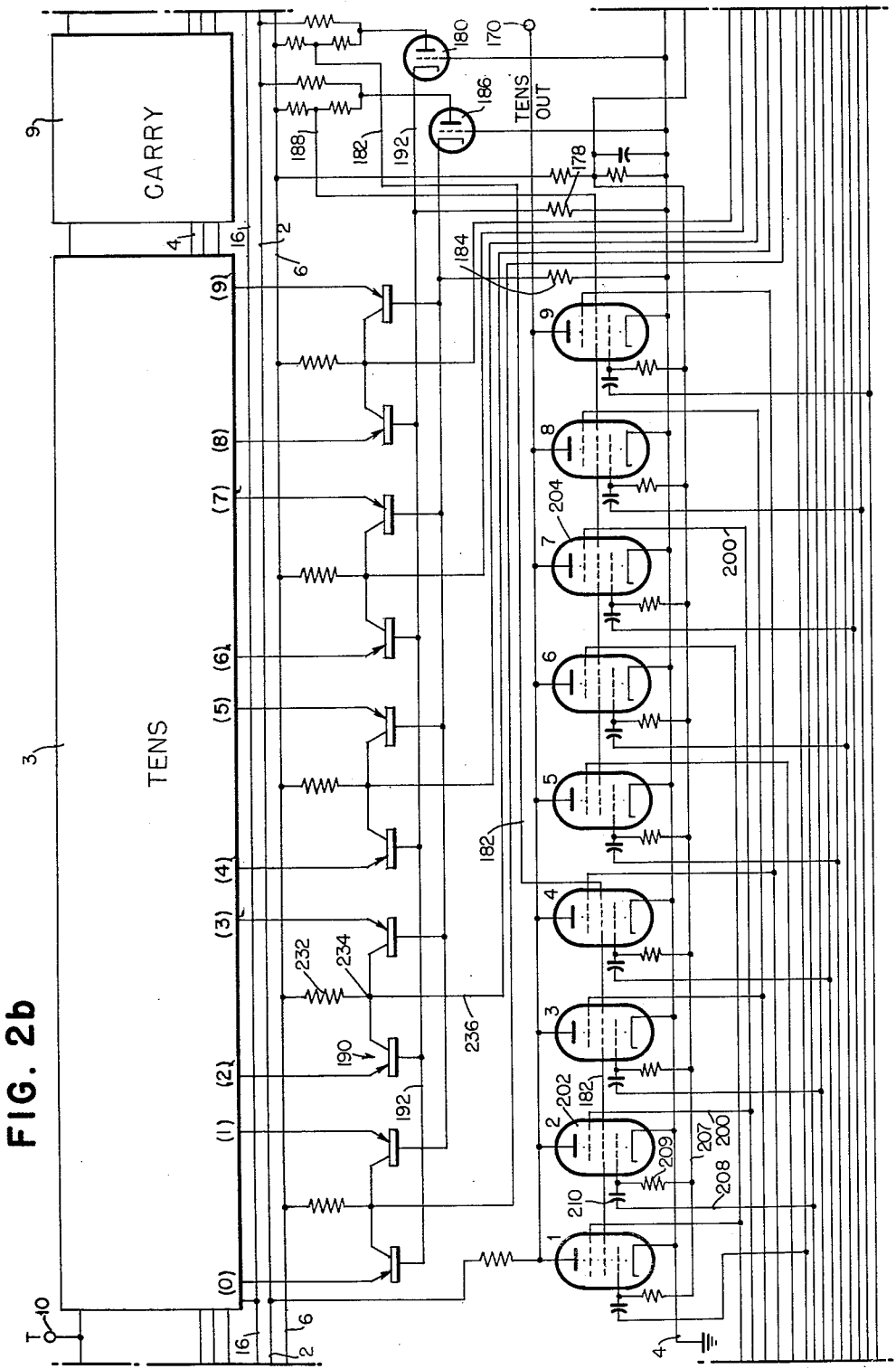
Figures 2D, 4A:
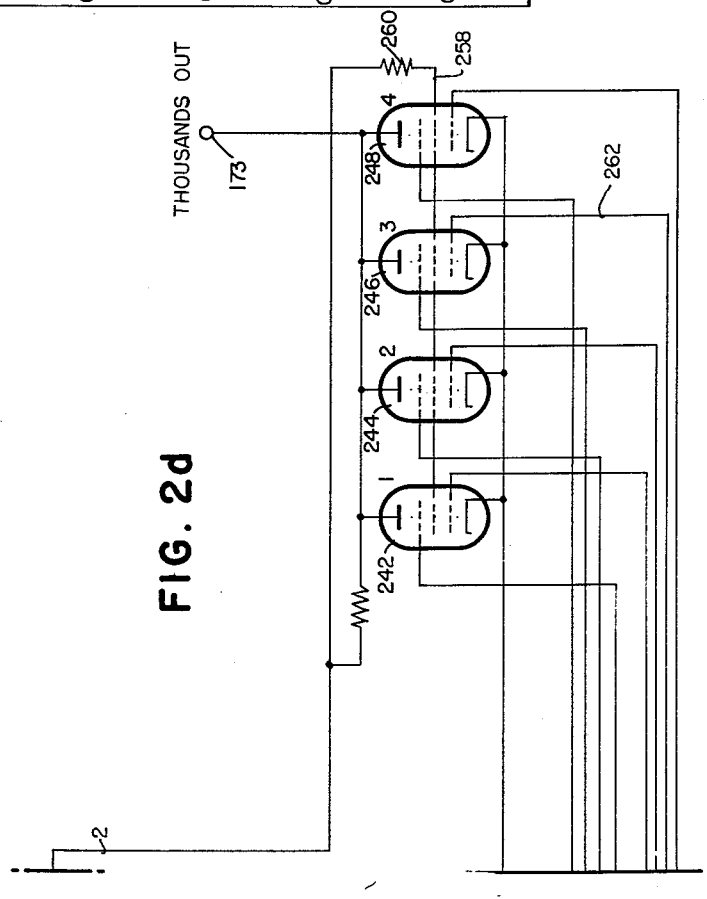
FIG. 4a is a chart illustrating the operation of the system of FIG. 4.

FIG. 4a illustrates the two additions just described. The read-in column shows the values added into each counter during the read-in cycle. These values are produced in response to the multiplicand input pulses. The transfer column shows the values added to the counters during the transfer cycle, the dotted lines indicating the source of the second additions. The compute column shows the sums of the two additions made during the first two cycles, and also shows the multiplicand values obtainable during a compute cycle from the readouts 401 associated with each counter. At the end of the second or transfer cycle the system stops and awaits further control, which may be either manual or automatic.

The overall operation of the arrangement of FIG. 4 may be better understood by considering several specific examples with particular reference to FIG. 4a. The multiplicand X3 is obtained by introducing the multiplicand X1 pulses on line 537 into register B during the read-in cycle, and the multiplicand X2 pulses from the correspondingly designated transfer gate 404 during the transfer cycle. The resultant sum, or the multiplicand X3, is read out of register B through the X1 readout to provide the multiplicand X3 at the correspondingly designated output gate 405. The multiplicand X6 is obtained from the same setting of register B by reading out through the X2 readout. The multiplicand X4 is obtained by introducing the multiplicand X2 pulses on line 533 into register C during the read-in cycle, and there adding to them multiplicand X2 pulses supplied during the following transfer cycle through the correspondingly designated transfer gate 404. The resultant sum, which is the multiplicand X4, is passed through an X1 readout to the designated output gate. The multiplicand X8 is obtained by passing the same register C setting through an X2 readout.

Register D is used to provide the multiplicand X7. This register is supplied with the multiplicand X2 pulses on line 533 during the read-in cycle, and with the multiplicand X5 pulses from the three right-hand transfer gates 404 during the transfer cycle. The resultant setting of register D corresponds to the multiplicand X7. The multiplicand X9 is obtained from register E, which is supplied with the multiplicand X10 pulses during the read-in cycle and, during the transfer cycle, with the true complement of the multiplicand X1 pulses from the three left-hand transfer gates 404. How this complement is formed will be described in detail later. The resultant of these two groups of pulses is the multiplicand X9. It is the equivalent of subtracting the multiplicand X1 from the multiplicand X10, as indicated by the encircled minus sign in FIG. 4a.

A pulse applied to terminal 532 starts commutator unit 11 through a third cycle. During this "compute" cycle, transfer gate 404 are closed and output gates 405 are open. As commutator unit 11 advances, differentially timed pulses from readouts 401 are transmitted through the now-open output gates and output terminals 543 to associated equipment (not shown). Thus during this cycle, multiple components of the multiplicand, X1 through X9, are developed at output terminals 543. This third cycle may be repeated as often as required by the application of additional pulses at terminal 532.

Before the operation of the system is discussed in detail, the inter-relationship of the various controls will be briefly outlined. A start pulse at terminal 502 is transmitted through the sequence control circuits and then through line 523 to start a first cycle of operation of commutator unit 11. The sequence control establishes that, during this initial cycle, transfer gates 404 and output gates 405 are closed. The circuits are controlled respectively by lines 573 and 544. The sequence control further insures that, during the second or transfer cycle, the transfer gates are open and the output gates closed. The secondary pulse source is a source of square-wave pulses and is connected by line 567 to input control unit 403. The single- and double-valued output pulses from the input control gates are obtained from this square-wave voltage. The compute control initiates the third commutator cycle. It restores control triggers in the sequence control circuit to their OFF status and the output gates are thus opened. Commutator unit 11 provides control pulses such as the end of cycle pulse to the compute control and the sequence control circuits by line 527, as well as other gate and trigger control pulses such as "0" time by line 540. The commutator unit also provides, by cable 406, differentially timed pulses representing values of "1" through "9" for use in the gate circuits of readouts 401.

Detailed operation will now be discussed. A cycle of operation is started by applying a negative pulse to terminal 502 (FIGS. 4 and 5a). This pulse switches ON a bistable trigger circuit T1 comprising triodes 503 and 504. One function of trigger circuit T1 is to control the operation of the output gates 405 (FIG. 5d) by means of lead 544, in a manner to be described later. When trigger T1 is ON (tube 504 conductive), the output gates are closed. When trigger T2 is OFF, the output gates are open. As will be pointed out later, trigger T1 also has other functions. When trigger T1 switches ON, junction 505 decreases in potential, and the resulting negative-going pulse is applied by lead 506 and capacitor 507 to the grid of triode 508. Thus trigger circuit T2, comprising triodes 508 and 509, is also switched ON (tube 509 conductive). Trigger T2 is provided to insure in-step operation of the commutator in the event that the start pulse occurs at a random time. When switched ON, trigger T2 remains ON until the next positive pulse, from a source to be described, occurs. These pulses appear on a lead 510 and are applied through a capacitor 511 to the grid of a triode 512. These positive pulses establish the index time and are effective in switching trigger T2 OFF as a result of the momentary conduction of triode 512.

When trigger T2 switches OFF, its junction 513 rises sharply, so that conduction through cathode follower 514 increases. Hence junction 515 also rises sharply, this junction serving as a low-impedance source of potential which may be utilized, by means of a lead 516, to unlatch a card feeding mechanism (not shown) or otherwise to begin a read-in cycle in equipment associated with the system of the present invention. Junction 515 is also coupled through a capacitor 517 to a lead 518 which connects to the grid of a normally nonconductive triode 519. When trigger T2 switches OFF, triode 519 becomes momentarily conductive, and the resultant negative-going pulse appearing at its anode is applied through a capacitor 520 to the positively biased grid of a normally conductive triode 521. This tube becomes momentarily nonconductive, the resultant positive-going pulse at its anode being applied, by means of a capacitor 522 and lead 523, to commutator unit 11. This pulse initiates a cycle of operation of the commutator, this first cycle being the read-in or card feed cycle of the machine operation, as indicated on the timing diagram of FIGS. 6a–6c.

Upon termination of the first or read-in cycle of operation, a positive pulse is produced on lead 527 (FIGS. 4 and 5a) when commutator unit 11 is restored to its initial status. Lead 527 connects to the suppressor grid of a pentode 528, the control grid of which is already at zero bias due to the ON status of trigger T1. Thus anode current flows momentarily in this tube through a portion of the network of a trigger circuit T3, causing this trigger to switch ON (right-hand portion of tube 407 conductive). As trigger T3 switches ON, its junction 529 rises in potential and the resulting positive-going pulse is applied through a capacitor 530 and lead 518 to the grid of triode 519. As previously explained, a positive pulse applied to this grid causes commutator 11 to start a cycle of operation. This second cycle is referred to as the transfer cycle (see FIG. 6b). Transfer gates 404 (FIGS. 4 and 5c) are opened when trigger T3 is switched ON, due to the resultant negative-going pulse on lead 573. These gates will be described later. At the termination of the second or transfer cycle, a positive pulse again appears on lead 527, causing momentary conduction of pentode 528. Since trigger T3 is already ON, however, no further effect from this pulse occurs, and thus no start pulse is generated at the end of the second machine cycle to automatically begin a third machine cycle. Instead, the system remains idle awaiting further control.

The third cycle of operation, called the compute cycle, is initiated by applying a negative pulse to a terminal 532 (FIGS. 4 and 5a). This pulse is supplied, by lead 533 and a capacitor 534, to the grid of one of the triodes comprising trigger circuit T4, so that this trigger is switched ON. Its junction 535 rises and conduction through a triode 536 increases, thereby causing a junction 531 to rise in potential. This junction is connected by a lead 538 to the anodes of diodes 539 and 580, so these diodes are rendered conductive and trigger circuits T1 and T3 are switched OFF. Trigger T4 is next switched OFF at index time in the same manner that trigger T2 was switched OFF. When trigger T4 switches OFF, its junction 541 rises sharply and the resultant positive-going pulse is applied by means of a capacitor 542 and lead 518 to the grid of triode 519. As previously described, this produces a start impulse which causes the commutator to operate through another complete cycle. During this cycle, output gates 405 are open since trigger T1 is OFF. Since trigger T3 is OFF, transfer gates 404 are closed. Multiple components of the multiplicand, X1 through X9, are generated on all output terminals 543 (FIG. 5d). As many compute cycles as required may be obtained by applying additional pulses to terminal 532. When no further use for the multiplicand and its components exists, the registers and readouts are reset by the operation of a reset switch or cam-operated contact.

Output gates 405 are controlled by trigger T1. The status of this trigger determines the potential of lead 544 which is connected at junction 547 to the cathode of tube 546 (FIG. 5a). During the read-in and transfer cycles of operation, trigger T1 is ON so that the potential of its junction 545 is high, conduction of tube 546 is high, and junction 547 is high. When trigger T1 is OFF, the potential of junction 547 is low. As shown in FIG. 5d, lead 544 connects to one grid of a conventional double triode gate circuit connected in each output line from the counter readouts. For example, lead 544 connects to the grid of a triode 548 in the multiplicand X9 output gate shown by way of illustration in FIG. 5d. The anodes of triodes 548 and 550 connect through a resistor 549 to positive line 2. The grid of triode 550 connects through a resistor 551 to positive line 2. Junction 554 is normally low in potential due to the conduction of either or both of triodes 548 and 550. The multiplicand X9 units output line 552 carries output pulses in the form of negative-going differentially timed pulses, as previously explained. When such a pulse is applied through a capacitor 553 to the normally positively biased grid of triode 550, this tube is rendered momentarily nonconductive. If trigger T1 is OFF, the potential of lead 544 is low and triode 548 is also nonconductive. Junction 554 thus momentarily rises to produce a positive-going output pulse at units output terminal 543. If trigger T1 is ON, however, the potential of lead 544 is high and triode 548 is conductive. Thus junction 554 is prevented from rising in response to a negative-going pulse on lead 552. Output is therefore suppressed and the output gate may be referred to as closed.

The secondary pulse source (FIG. 5a) comprises a trigger circuit T5, a double triode gate circuit 440, an inverter tube 558 in the gate input circuit, and a cathode follower output tube 565. Trigger T5 is alternately switched ON and OFF by successive negative pulses applied at terminal 430 from the primary pulse source (not shown). Gate circuit 440 is alternately opened and closed under the control of trigger T5. When trigger T5 is ON, the gate is closed; and when trigger T5 is OFF, the gate is open. Positive primary pulses at terminal 430 are applied, by a lead 556 and a capacitor 557, to the grid of inverter tube 558. The resulting negative-going pulses at the anode of triode 558 are applied through a capacitor 559 to the grid of normally conductive gate triode 560. Thus for each positive primary pulse, triode 560 is made nonconductive. If trigger T5 is ON, the conduction of gate triode 561 prevents junction 562 from rising. If trigger T5 is OFF, however, junction 562 rises and a positive-going pulse is applied through a capacitor 563 to lead 510. Thus every other positive primary pulse is passed through gate circuit 440 to appear on lead 510. These pulses establish the index times during cycles of operation. They serve as the stepping pulses for commutator unit 11, being used to switch OFF either trigger T2 or trigger T4 to start the commutator at an index time.

Another output from the secondary pulse source is obtained from junction 564 of trigger T5. This junction is connected to the grid of cathode follower triode 565. A square-wave voltage, in phase opposition to the output voltage of trigger T5, as shown in FIG. 6, appears at junction 566. This junction is at the lower of its two potentials when trigger T5 is ON, and at the higher value when trigger T5 is OFF. Junction 566 is connected by lead 567 to input control unit 403 (FIGS. 4 and 5b) and to transfer gate unit 404 (FIGS. 4 and 5c).

As shown in FIGS. 4 and 5b, two multiplicand input terminals are provided; terminal 500 is for the units column and terminal 501 for the tens column. The system illustrated is intended for multiplicand inputs each comprising a single differentially timed negative pulse to represent values of "1" through "9." Input control unit 403 serves to convert each differentially timed impulse into a number of pulses equal to the multiplicand value, and it has a second output to provide a number of pulses equal to twice the value of the multiplicand input pulse. FIG. 5d shows the units portion of input control unit 403 in detail, and the similar tens portion as a block. Let it be assumed that all the registers are reset to zero and that the system has been otherwise prepared for an entry. Suppose that the multiplicand value to be used is "26." Accordingly, a differentially timed impulse occurring at "6" index time appears at units input terminal 500, and a pulse at "2" index time appears at tens input terminal 501, during a read-in cycle.

In the units order trigger T7 is switched ON at "6" index time, so that junction 524 is made negative with respect to ground line 4. This junction is connected by a lead 525 to the grid of a gate triode 526, so that this tube is nonconductive. The grid of triode 427 is connected to junction 566 (FIG. 5a) by lead 567. Thus, when trigger T5 is ON, triode 427 is nonconductive; and when trigger T5 is OFF, triode 427 is conductive. Accordingly, the waveform at junction 428 during the time that trigger T7 is ON is the same as that shown in FIGS. 6a–6c for trigger T5.

At the "6" index time a negative pulse on units input terminal 500 turned ON trigger T7. At that instant trigger T5 was OFF and its junction 564 was high in potential. Accordingly, triode 427 was conductive. Junction 428 remained low when trigger T7 switched ON even though triode 526 became nonconductive. A short time later (at ¼ index point) trigger T5 switched ON, making triode 427 nonconductive and thus allowing junction 428 to rise in potential. The resultant positive-going pulse is applied, by means of lead 429 and capacitor 450, to the grid of cathode follower 431. Junction 432 and lead 533 thus rise in potential to provide a positive-going output pulse at this time. Still later during the "6" point (at ¾ time), trigger T5 switches OFF, causing a negative shift at junction 428. The resultant negative-going pulse is applied through a capacitor 434 to the grid of a normally conductive triode 435. This triode is thus momentarily cut off, producing a positive-going pulse at a junction 436 and on lead 537. This pulse is also applied through a capacitor 438 to the grid of a cathode follower 439, having a common load resistor with cathode follower 431. Junction 432 is therefore also impulsed positively when trigger T5 switches OFF. Thus during the "6" index point a single positive pulse is produced on output lead 537, and two positive pulses are produced on output lead 533. This is repeated for the next five index points, resulting in a total of six pulses on lead 537 and twelve pulses on lead 533. At the "0" index time a positive pulse on lead 540 is applied through a capacitor 541 to the grid of a triode 542, which causes trigger T7 to switch OFF. The resulting conduction of triode 526 prevents junction 428 from following the alternations of trigger T5, so that further output pulses on leads 537 and 533 are suppressed.

The multiplicand input control circuits for the tens order are identical with those just described for the units order. In the example cited, the equivalent of trigger T7 in the tens order would be switched ON at "2" time and OFF at "0" time. Two output pulses would appear on one output lead and four on the other. These output pulses are applied directly to the input circuits of the counters, as described later.

During transfer cycles the transfer gates (FIGS. 4 and 5c) are conditioned to be operated by the pulses on the X1, X2 and X5 readout lines from register A. The output pulses from the transfer gates are supplied to the input circuits of the remaining registers. During the first machine cycle "026" is read into register B. By column shifting the input lines, "260" is read into register E. Registers C and D obtain their inputs from those multiplicand input lines carrying impulses corresponding in number to twice the value of the multiplicand. During the first machine cycle, therefore, "052" is read into registers C and D.

During the second machine cycle the value contained in register A is analyzed and X1, X2 and X5 the multiplicand is made available on the readout lines associated with this register. These output pulses are used during this cycle to operate the transfer gates at the proper index time to produce a number of pulses equal to the value of the differentially timed impulse on each output line, as for example line 581 (FIG. 5c). The outputs of the transfer gates are fed into registers B, C, D and operated in the same manner. The transfer gates for X2 and X5 readouts of register A are all arranged and operated in the same manner. The transfer gates for the X1 readout of register A, however, are controlled in such a manner that the true complement of the multiplicand appears at the output of these transfer gates.

Consider first the transfer gates for the X2 and X5 readouts. One of these gates is shown in detail in FIG. 5c. As previously explained, all transfer gates are conditioned to be open during the transfer cycle, due to the operation of trigger T3 (FIG. 5a). When the trigger T3 is ON, the potential of lead 573 (FIGS. 5a and 5c) is low and triode 574, for example, is rendered nonconductive. When trigger T3 is OFF, the potential of lead 573 is high and tube 574 is conductive. At the beginning of a transfer cycle trigger T3 switches ON, making triode 574 nonconductive. Further control of this transfer gate is then determined by the status of associated trigger circuit T6.

During transfer cycles trigger T6 is switched ON by a pulse from the readout device as supplied on output line 581. When trigger T6 switches ON, both of triodes 574 and 577 are cut off and junction 578 is free to respond to the grid control applied to a triode 576 by lead 567. The potential of junction 578 is thus determined by the status of trigger T5 in the secondary pulse source circuit (FIG. 5a). For example, let it be assumed that a "1" is read out of counter A on hundreds lines 581 of the X5 readout (26×5=130). A negative pulse at the "1" index time will then appear on line 581. The pulse switches trigger T6 ON, thus opening the gate comprising triodes 574, 576 and 577. At index time the potential of lead 567 is high since trigger T5 is OFF. At ¼ index point later, trigger T5 switches ON, making triode 576 nonconductive. Since all three triodes are now nonconductive, junction 578 rises. The resultant positive-going pulse is applied through a capacitor 579 to the already positive grid of a triode 582. Accordingly, no further effect of this pulse occurs. At the ¾ time during this same index point, trigger T5 switches OFF. Triode 576 becomes conductive and junction 578 drops in potential. The resultant negative-going pulse renders triode 582 momentarily nonconductive. A positive-going pulse is thus produced at output terminal 583. While triode 576 is still conductive, a positive pulse on lead 540 switches trigger T6 OFF. Triode 577 therefore again becomes conductive and further output pulses from this gate are suppressed. All transfer gates used in the X2 and X5 circuits operate in a similar manner.

Consider now those transfer gates used to develop the true complement of the multiplicand. These gates are identical with the gate just described, their operation differing only in that controlling pulses are obtained from other sources. As illustrated in FIG. 5c, terminals 601, 604 and 605 of the three X1 transfer gates are the functional equivalent of junction 550 of the X5 transfer gate shown in detail in this figure. The true complement of the multiplicand "026" is "974" (1000−026). To obtain this value the X1 transfer gates are opened automatically early in the transfer cycle and are closed by the output pulse from the X1 readout lines of register A. The units gate is always opened at D index time by a pulse applied to its terminal 601, and closes upon receiving an impulse from the register A X1 units readout. The tens gate is always opened at "9" index time by a pulse applied to its terminal 604, and is closed upon receiving an impulse from the register A X1 tens readout. The hundreds gate also is always opened at "9" index time by a pulse applied to its terminal 605 and closes at "0" index time, so that it always provides nine output pulses. Thus it will be apparent that the units transfer gate, in the example under consideration, produces four output pulses. The tens gate produces seven output pulses, since it is closed at "2" time. The hundreds transfer gate provides nine output pulses. The outputs of these three transfer gates, as shown in FIG. 4, are supplied to register E. The result of adding the multiplicand X10 and the true complement of the multiplicand X1 is the multiplicand X9. The sequence of operation for the true complement transfer gates during a transfer cycle for a multiplicand of "026" is graphically illustrated in FIG. 6a.

QUINARY NOTATION

Multiplicand X2

FIGS. 7a–7c show an arrangement, utilizing quinary notation, for providing readout pulses having a numerical value twice that of the multiplicand. The register is preferably arranged and operated in accordance with the disclosure of Dickinson Patent 2,402,988 issued July 2, 1946, and it comprises three orders represented respectively by boxes 740, 750 and 760. Each order comprises six digit-manifesting elements which are preferably bistable trigger circuits each having an OFF and an ON status. These elements are respectively designated 0,5; 1,6; 2,7; 3,8; 4,9 and 5–9, these designations indicating which triggers are ON for any given digit value. For example, if a "5" is entered into a counter, its 0,5 and 5–9 stages are ON and all other stages are OFF.

Let it be assumed that a multiplicand value of "026" has been entered in the register. In units order 740 triggers 1,6 and 5–9 are ON. All other triggers are OFF. This represents a "6." In tens order 750, trigger 2,7 is ON and all other triggers are OFF, this representing a "2." In hundreds order 760, only trigger 0,5 is ON to designate a "0." The output required from this X2 readout device is "052" (026×2=052), and this is obtained as described below.

Since units order trigger 1.6 is ON, junction 700 is low (substantially at ground potential). The cathode of a pentode 701 is connected to junction 700. The suppressor grid of pentode 701 is connected to ground line 4. The screen grid of this tube is connected by a lead 702, a resistor 703 and a lead 704 to positive line 2. The control grid of tube 701 is coupled by a capacitor 705 to output line 22 of commutator unit 11. At the "2" index time, therefore, this grid is impulsed positively, making pentode 701 momentarily conductive. Anode current flows through lead 704, a load resistor 706 and a lead 707. As a result, a negative-going pulse is produced at units output terminal 708 at "2" time. As previously explained in connection with FIGS. 1a–1c, the only output pulses required from the units order are "2," "4," "6" and "8." In the device of FIGS. 7a–7c, for the example under consideration the latter three output pulses are suppressed due to the raised potential of the control lead from each of the corresponding triggers, so that the associated pentode is rendered nonconductive due to having its cathode positive with respect to its suppressor grid. No gate is needed under control of units trigger 0,5 since a units multiplicand value of either "0" or "5" when doubled results in an output value in the units column of "0." This value is represented by the absence of an output pulse at terminal 708.

A governing section comprising triodes 709 and 710 is controlled in its operation by units trigger 5–9. As explained in connection with FIGS. 1a–1c, whenever the units digit is in the "5" through "9" range, the output value in the tens order must be increased by "1." Trigger 5–9 of the units order is OFF for digits "0" through "4" and ON for digits "5" through "9." In the tens order unit 750, trigger 2,7 is ON, so that the cathodes of pentodes 716 and 717 are at substantially ground potential. These pentodes are the gate tubes for the "4" and "5" tens output pulses, respectively. With trigger 5–9 of the units order ON, the governing section of the units order operates to insure that the higher value, that is "5," is selected in the tens order.

When units trigger 5–9 is ON, triode 709 is conductive and the potential of junction 711 is low. The grid of triode 710 is therefore also low, and this tube is nonconductive so that junction 712 is at a high potential. Junction 713 on a voltage divider comprising resistors 714 and 715 is also at its highest potential. Junction 718 on voltage divider 719, 720 is low since junction 711 is low. Junction 713 is connected by a lead 721 to the screen grids of the Nos. 1, 3, 5, 7 and 9 tens output gate pentodes. Junction 718 is connected by a lead 722 to the screen grids of the Nos. 2, 4, 6 and 8 tens output gate pentodes. With units trigger 5–9 ON, the voltage on lead 721 is high, making the odd-numbered tens pentode gates potentially conductive. At the same time, the voltage on lead 722 is low, thus maintaining the even-numbered tens pentode gates nonconductive. Although the cathodes of both of tubes 716 and 717 are low in potential, making it possible for these tubes to conduct, it is only pentode 717 which is actually conductive because its screen grid potential is high. Thus at the "5" time, a negative-going pulse is produced at tens output terminal 723. In the hundreds unit 760, trigger 0,5 is ON, making pentode 724 potentially conductive. Since tens order trigger 5–9 is OFF, however, the potential of lead 725 is low. Thus conduction of this gate tube, which handles pulses at "1" time, is suppressed and no output pulse occurs on hundreds output terminal 726.

The carry circuits for the registers shown in FIGS. 7a–7c have been omitted for simplicity. Where required, they would be arranged and operated in much the same manner as described above in connection with FIGS. 3a and 3b. Since trigger 5–9 in each order switches OFF as the register goes over from "9" to "0," recognition of this condition by the carry trigger circuits may serve as the carry control.

Multiplicand X5

The arrangement of FIGS. 8a–8c utilizes quinary notation and provides readout pulses having a numerical value five times that of the multiplicand. As in the system of FIGS. 7a–7c, each of the three register orders 870, 880 and 890 comprises six digit-manifesting elements, preferably bistable trigger circuits each having an OFF and an ON status, respectively designated 0,5; 1,6; 2,7; 3,8; 4,9 and 5–9 to indicate which triggers are ON for any given digit value. The principle of operation is the same as that of the system of FIGS. 2a–2d.

Associated with each order of the register there is provided a governing circuit for determining whether the digit contained in the order is odd or even. Each of the first two orders 870 and 880 is also provided with carry circuits. As previously explained, carry amounts of "1," "2," "3" and "4" may be required from a given order to the next higher order. In the case of units order 870 (FIG. 8a) the governing circuit comprises pentodes 800 and 801 arranged as a double pentode gate circuit. The control grids of tubes 800 and 801 are connected to suitable junctions of units trigger circuit 5–9 in such a manner that, when this trigger is ON, pentode 800 is potentially conductive and pentode 801 is rendered nonconductive. A second control of the conduction of these pentodes is obtained by adjustment of their cathode potentials. If the cathode of one tube is raised substantially above ground potential, this tube is rendered nonconductive regardless of the status of units trigger 5–9.

Once again, let it be assumed that a multiplicand value of "026" has been entered in the register. In units order 870 triggers 1,6 and 5–9 are ON, all other triggers being OFF, this representing a "6." In tens order 880, trigger 2,7 is ON and all other triggers are OFF, to represent a "2." In hundreds order 890, only trigger 0,5 is ON to designate a "0." The output required from this X5 readout device is "130" (026×5 =130), and this is obtained in the manner about to be described. Since units trigger 5–9 is ON, pentode 801 is nonconductive due to the negative bias on its control grid. As far as its control grid is concerned, pentode 800 is potentially conductive. The cathode of pentode 801 is connected by a lead 804 to junctions in units order triggers 0,5; 2,7 and 4,9 which are at ground potential when these triggers are OFF. Hence the cathode of pentode 801 is at ground potential under this condition. A resistor 808 is connected between this cathode and ground line 4. The cathode of pentode 800 is grounded through a resistor 807, and is also connected by a lead 805 to junctions in units order triggers 1,6 and 3,8 which are above ground potential when these triggers are ON. Since trigger 1,6 is ON in the present case, the cathode of pentode 800 is positive enough to render this tube nonconductive. The suppressor grids of pentodes 800 and 801 are made momentarily positive at the "5" time in each operating cycle of commutator unit 11. Since both pentodes are rendered nonconductive by one means or another, as just described, the gate is closed and no output pulse is developed at units output terminal 809. This is the desired result since 6×5=30, the "0" being the units output value.

A "3" carry is required for the tens order. Since the tens digit ("2") is even, the "3" carry is to be added to "0." The output pulse for the tens order is therefore "3," obtained as follows. A junction 810 is connected to units trigger 1,6 in such a manner that this junction has a relatively low potential when this trigger is ON, as it now is in the case under consideration. A resistor 830 of relatively low impedance is connected between junction 810 and ground line 4. Junction 810 is also connected by a crystal diode 811, a lead 813 and a resistor 831, of relatively high impedance, to positive line 2. The polarity of diode 811 and the values of resistors 830 and 831 are so chosen that, when trigger 1,6 is ON, junction 812 is substantially at ground potential. Lead 813 connects to the cathodes of pentodes 814 and 816 (FIG. 8b). These pentodes are thus made potentially conductive as far as their cathode circuits are concerned. A similar circuit through diode 815 and lead 832 extends to the cathode of a pentode 833, which is also rendered potentially conductive. The control grids of pentodes 814 and 816 are connected by a lead 835 to a junction in units trigger 5–9 which is high (that is, near ground potential) when this trigger is ON. Thus these tubes are still potentially conductive. Pentode 833, however, is made nonconductive since its control grid is connected to lead 834, which is negative relative to ground when units trigger 5–9 is ON. Thus it is either the "3" or the "8" gate which will momentarily open during a cycle, depending on the even or odd status of the tens order.

The digit in the tens order is "2". Since this is an even digit, it is the "3" pulse that is desired at tens output terminal 860. The governing circuit for this order differs slightly from that just described for the units order. Tens order trigger 5—9 is OFF. Triode 851 is thus made nonconductive by the negative voltage on its grid. The grid of triode 850 is near ground potential. Trigger 2, 7 in the tens order is ON, so current flows through a resistor 852. Triode 850 is therefore made nonconductive since its cathode is raised higher than its grid. With both of triodes 850 and 851 nonconductive, junctions 854 and 855 are high in potential. Junction 855 is connected by a lead 836 to the screen grid of pentode 814. Junction 855 is also connected through a resistor 856 to the grid of a triode 857. This tube is thus conductive, so that junction 858 is low in potential. Junction 859 is also low (that is, below ground potential), and it is connected by lead 837 to the screen grid of pentode 816, thus rendering this tube nonconductive. Thus it is apparent that, of the three pentodes made potentially conductive as a result of the ON status of trigger 1, 6 in the units order, it is only the "3" output gate in the tens order which has all of its elements favorably conditioned to provide an output pulse at tens output terminal 860 during a readout cycle. The suppressor grid of pentode 814 is connected to line 23 from commutator unit 11 and is normally negative. At the "3" time it is impulsed positively from this source. The momentary resultant conduction of pentode 814 produces a negative pulse at "3" time at tens output terminal 860. If the tens digit had been odd, conduction of either of triodes 850 and 851 would have reversed the status of the potential on leads 836 and 837, and an "8" pulse would have been produced at tens output terminal 860.

It will be apparent that operation of the hundreds order is similar, and that additional orders may be provided, if necessary, following the arrangement just described for the tens order.

BINARY-CODED DECIMAL NOTATION

*Multiplicand X2*

FIGS. 9a–9c show an arrangement, utilizing binary-coded decimal notation, for providing readout pulses having a numerical value twice that of the multiplicand. The register is preferably arranged and operated in accordance with the disclosure of Phelps Patent 2,584,811 issued February 5, 1952, and it comprises three orders represented respectively by boxes 970, 980 and 990. Each order comprises four digit-manifesting elements which are preferably bistable trigger circuits each having an OFF and an ON status and designated respectively as the 1, 2, 4 and 8 elements or stages. The digits "0" through "9" are represented by the ON condition of combinations of these elements such that the sum of their designations equals the digit to be represented. The readout circuits associated with the register interpret the value in the register and cause the appropriate gate to open in each order to provide the proper output pulse.

Let it be assumed that "026" stands in the register. In units order 970, stages 2 and 4 are ON and stages 1 and 8 OFF. The right-hand portions are nonconductive in stages 1 and 8, and conductive in stages 2 and 4. Thus in stage 2, for example, current flows through the emitter-base path of a transistor 903 to ground. The impedance of the collector-base path of this transistor is therefore substantially reduced, so that the collectors of this transistor all have potentials near ground. Since the left-hand portion of stage 2 is nonconductive, no current flows in the emitter-base path of a transistor 904. Accordingly, the impedance of the collector-base paths of this transistor remains relatively high. One collector 905 of transistor 904 connects by a lead 906 through a resistor 907 to negative line 6. One collector 909 of a transistor 910, associated with stage 1, also connects to lead 906.

Since stage 1 is off, its right-hand portion is nonconductive and collector 909 accordingly carries a low current. One collector 911 of a transistor 912, associated with stage 4, is connected also to lead 906, and this collector is likewise in a state of low conduction. It is apparent, therefore, that for a units order value of "6" all three collectors of transistors 904, 910 and 912 are in a state of low conduction. Thus relatively little current flows through resistor 907 and triode 913 is at cut-off. Its cathode resistor 914 is of relatively low impedance, so that junction 915 is substantially at ground potential.

Junction 915 is connected by a lead 916 through a diode 917 to the cathode of a pentode 918. The polarity of this diode is such that the cathode of tube 918 is also substantially at ground potential. When this cathode is at ground, the grid-cathode bias is such that the pentode becomes potentially conductive. At the "2" time the normally negative suppressor grid is impulsed positively by lead 22 from commutator unit 11, thus rendering pentode 918 momentarily conductive. A negative pulse at "2" time is thus supplied by a lead 919 to units output terminal 920. As will be apparent from this example, for each order value "1" through "9" there is a common collector lead which is substantially negative, all the other leads being substantially at ground potential. Each lead controls one of the four pentode gates respectively arranged to pass pulses at "2," "4," "6" and "8" times when they are open.

If the value is greater than "5," as it is in the present case, the amount read out of the next higher order must be increased by "1." Triodes 921—925 serve to control carrys from the units order to the tens order. Let it be assumed for the moment that a "0" instead of a "6" is in the units order. For a "0," the right-hand portions of all four stages of the units order are nonconductive, so that all collectors of the associated transistors which are connected to "0" collector lead 926 are in a state of low conduction and current flow through a resistor 927 is at a minimum. Current flow through a triode 928 is thus also at a minimum and the potential of junction 929 is low. The cathode of triode 921 is connected to junction 929, so that this tube is conductive. Current flows from ground line 4 through a resistor 930, a lead 931, triode 921, a resistor 932 to a negative line 933. Because of the conduction of triode 921, a junction 934 becomes more negative with respect to ground. A junction 935 is also made more negative, cutting off conduction in a triode 937 and causing the potential of a junction 936 to be raised. It is apparent, therefore, that when the units order contains a "0" triode 921 is made conductive, thus establishing a relatively low potential on lead 931 and a relatively high potential on a lead 938 connected to junction 936. Likewise, when the units order contains a "1," conduction of triode 922 produces the same status of control potentials on leads 931 and 938. Triodes 923, 924 and 925 conduct respectively for values of "2," "3" and "4." For units order values of "5" through "9," all triodes 921—925 are nonconductive, and the potential of lead 931 is high and that of lead 938 low. This is the condition which exists, for example, when the multiplicand value is "026,'" as presently being discussed. The utilization of these two potentials to control carrys will be described in connection with the tens order of the system.

In the tens order, stage 2 is ON. All the other stages are OFF. Collector currents through a transistor 939 associated with stage 2 are at a minimum. Collector currents through transistors 940, 941 and 942, associated respectively with stages 1, 4 and 8, are also at a minimum. A common lead 943 joins one collector of each of transistors 939, 940 and 941. Lead 943 is connected through a resistor 944 to negative line 6. Lead 943 is at its most negative potential when there is a "2" in the tens order. This lead is connected by a lead 945 to the grid of a triode 946. Thus this triode is at cut-off and a junction 947, connected to its cathode, is low in potential, substantially that of a line 950, the potential of which in turn is established at a value somewhat negative relative to ground by a voltage divider comprising resistors 952 and 954 and stabilized by a capacitor 956 (FIG. 9a). Since junction 947 is low in potential, a junction 960 is also near the potential of line 950. Junction 960 is connected by a lead 962 to the cathodes of pentodes 964 and 966. The control grids of these two pentodes are raised to the potential of line 950 respectively at "4" time and at "5" time, diodes 968 (FIG. 9a) serving to prevent the potential of the impulse lines from commutator unit 11 from rising higher than that of line 950.

In the example under consideration, the digit in the units order is "6." Accordingly lead 931 is high in potential and lead 938 low, as previously described. Lead 931 connects to the suppressor grid of pentode 966, thus making it potentially conductive. Lead 938 connects to the suppressor grid of pentode 964, so that this tube is rendered nonconductive. It will be apparent, therefore, that during a readout cycle, only pentode 966, which is the "5" gate, becomes conductive to provide an output pulse at "5" time at tens output terminal 969. Had the units digit been "4" or less, the potentials of leads 931 and 938 would have been reversed, with the result that pentode 964 would have become conductive to provide an output pulse at "4" time.

Since the operation of the hundreds order is similar, there is no necessity for describing it in detail. Because this is the highest order of the system here shown by way of example, no carry controls, such as triodes 921— 925 in the units order, are required in the hundreds order. Such carry controls are shown in block form in connection with the tens order, and their effect upon the operation of the hundreds order is the same as that of the units carry controls on the tens order.

*Multiplicand X5*

The arrangement of FIGS. 10a–10c, which utilizes binary-coded decimal notation and which provides readout pulses having a numerical value five times that of the multiplicand, is similar in many respects to the previously described arrangement of the FIGS. 9a–9c. The same type of register is used. The same arrangement of multiple-collector transistors is employed to interpret the value of each order and to manifest its value by the presence of a more negative potential on one of ten control lines. In the arrangement shown, it is necessary for the units order to establish whether the units digit is odd or even. In this arrangement the first trigger stage is ON for all odd-numbered digits and OFF for all even-numbered digits. Accordingly, the first trigger stage may be used to control the units output pulse gate.

When the first stage is ON, indicating that the first digit is odd, its right-hand portion is conductive so that a lead 973 is at the higher of its two potentials, that is, near ground potential. Lead 973 is connected to the suppressor grid of a pentode 974, thus making this pentode potentially conductive whenever an odd digit appears in the units order. The control grid of tube 974 is connected to impulse line 25 from commutator unit 11, and thus is raised to ground potential at the "5" time in each readout cycle of operation. The momentary conduction of this tube causes a negative-going pulse to appear at units output terminal 975. Carrys of "1," "2," "3" and "4" are provided to the tens order, as described in connection with FIGS. 9a–9c, where they are added to either "5" or "0" depending upon whether the tens digit is odd or even. In the example under consideration, in which the multiplicand value is "026," a carry of "3" must be added to "0." This is accomplished in a manner which will now be described.

In the units order the value "6" is represented by stages 2 and 4 being ON. Accordingly, line 976 is at a lowered potential since all the collectors connected together by this line are in a state of low conduction and relatively little current flows through resistor 977. Pentode 978 is thus maintained at cutoff due to the negative status of its suppressor grid. It should be noted that this tube may also be cut off by a negative voltage on its control grid. This control grid is connected to the line from the transistor collectors which is negative for a units value of "7." This is permissible since both a "6" and a "7" digit in the units order require a carry of "3" to the tens order. The same reasoning applies to the other control elements in the units order. Since pentode 978 is cut off, junction 979 is at a relatively high potential and a junction 980 on a voltage divider, connected between junction 979 and negative line 6, is also high in potential. Junction 980 is connected by a lead 981 to the control grids of pentodes 982 and 983 (FIG. 10b). Both of these pentodes are thus made potentially conductive as far as their control grids are concerned. Pentodes 983 and 982 serve as output gates respectively for the "3" and "8" pulses.

As was the case for the units order, the odd-even status of the tens order is indicated by the status of its first trigger stage. Since in the example being considered the tens digit is even, the first trigger stage is OFF. Lines 986 and 989 are therefore respectively high and low in potential. Line 986 is connected to the grid of a cathode follower 987, so that the potential of a lead 988 is also high. Line 989 is connected to the grid of a cathode follower 990, with the result that the potential of a lead 991 is low. Lead 988 extends to the screen grids of the pentode gates in groups 1–4, and line 991 is connected to the screen grids of the pentodes comprising groups 5–9.

It will be recalled that the control grids of pentodes 983 and 982 were both conditioned by the value standing in the units order, in such a manner that these pentodes are made potentially conductive. The screen grid of pentode 982 is connected to line 991, which is low in potential for the reasons just discussed. Conduction in this pentode is thus prevented, since the potential of lead 991 is substantially zero or slightly negative with respect to ground line 4. Line 988, on the other hand, is at a positive potential at this time, so that the screen grid of pentode 983 is conditioned favorably for conduction by this tube. During a readout cycle the suppressor grids of the gate pentodes are raised sequentially. At the "3" time conduction occurs in pentode 983, thus producing a negative-going output pulse at tens output terminal 992. Conduction in the other gates is prevented either by the negative biases on their control grids or by the reduced potentials on their screen grids, or combinations of both.

Control of the hundreds order output is achieved in the same manner. The value "2" in the tens order requires a carry of "1" to the hundreds order. This carry is to be added to either "0" or "5" to produce an output pulse of "1" or "6." The value "0" in the hundreds order, being an even digit, causes the odd-even control circuit to establish the voltage on lines 993 and 994 as high and low, respectively. Thus, of the two possible output pulses "1" and "6," it is the "1" pulse which is produced at hundreds output terminal 995. All the remaining gates 2–9 are conditioned closed as previously described. Inter-order carry circuits have been omitted for simplicity in FIGS. 9a–9c and 10a–10c, since the method of operation of these circuits has already been fully described. The connections for these carry circuits would in no way affect the readout operations just described. Whether or not such circuits are required is dependent solely on the use to which the readout device is to be put and how entries are to be made. The interpreting circuits employing multiple-collector transistors have been omitted from the hundreds order, but would obviously be required if the capacity of this device were to be expanded. In the event of such an expansion, interpreting circuits would be required in all but the highest order.

When the device is used for multiplying, relay contacts or switches MD1 are in the position shown. Outputs for the units, tens and hundreds orders obtained from their usual sources are applied to their respective output terminals 975, 992 and 995 through their associated normally closed MD1 contacts.

When the device is used for dividing, however, the position of contacts MD1 are reversed and the units, tens and hundreds orders of the register now have their outputs "column-shifted" and the outputs are applied through the now transferred MD1 contacts to the tenths, units and tens outputs, respectively.

For example, suppose 023 is contained in the register of FIG. 10. On multiplying, the value 115 is read out (023×5=115). On dividing, the value 11.5 is read out as a result of the column shifting effected by operation of contacts MD1 (023÷2=11.5). Thus, the device of FIG. 10 provides both ×5 and ÷2 readouts.

In a similar manner, the device of FIGS. 7a–7c may be arranged to divide by five instead of to multiply by two, and the device of FIGS. 3a–3b would serve to provide division by ten instead of multiplication by one.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electronic circuit for accepting an electrical manifestation representative of an input multi-order decimal quantity and rendering as an output an electrical manifestation representative of the two multiple of said input multi-order decimal quantity, said electronic circuit comprising in combination: electronic means for accepting said electrical manifestation representative of said input multi-order decimal quantity; electronic commutator means having a plurality of output terminals, each of said plurality of output terminals having a discrete electrical pulse thereon during successive time displaced discrete time intervals; electronic gating means interconnecting said electronic means and said plurality of output terminals of said electronic commutator means, said electronic gating means consisting essentially of the logical interconnections of a plurality of similar portions each having a gating circuit employing at least one transistor and a pentode, the pentode of each gate has its suppressor grid directly connected to the collector electrode of each transistor associated with said gate, a direct connection between the control grid of each pentode and a discrete one of said plurality of output terminals of said electronic commutator means, said portions being selectively responsive to said discrete electrical pulses from said electronic commutator means to render said output electrical manifestation representative of the two multiple of said input multi-order decimal quantity.

2. An electronic circuit for accepting an electrical manifestation representative of an input multi-order decimal quantity and rendering as an output an electrical manifestation representative of the five multiple of said input multi-order decimal quantity, said electronic circuit comprising in combination: electronic means for accepting said electrical representation of said input multi-order decimal quantity; electronic commutator means having a plurality of output terminals, each of said plurality of output terminals having a discrete electrical pulse thereon during successive time displaced discrete time intervals; electronic gating means interconnecting said electronic means and said plurality of output terminals of said electronic commutator means, said electronic gating means consisting essentially of a plurality of transistors and a plurality of grid controlled electron discharge devices logically connected thereto, the emitter electrodes of said plurality of transistors being directly connected to said electronic means, the collector electrodes of said plurality of transistors being directly connected to said grid controlled discharge devices, said grid controlled discharge devices being selectively responsive to said discrete electrical pulses from said electronic commutator means to render said output electrical manifestation representative of the five multiple of said input multi-order decimal quantity.

3. An electronic product generator for accepting an electrical manifestation representative of an input multi-order decimal quantity and rendering, as an output, nine discrete electrical manifestations respectively representative of the one through nine multiples of said input multi-order decimal quantity, said electronic product generator comprising in combination: electronic means for accepting said electrical manifestation representative of said input multi-order decimal quantity; electronic commutator means having a plurality of output terminals, each of said plurality of output terminals having a discrete electrical pulse thereon during successive time displaced discrete time intervals; first electronic gating means interconnecting said electronic means and said plurality of output terminals of said electronic commutator means, said first electronic gating means employing a plurality of transistors logically interconnected with a plurality of grid controlled electron discharge devices, said grid controlled electron discharge devices having the grids thereof connected to said plurality of output terminals of said electronic commutator means, and being selectively responsive to said discrete electrical pulses from said electronic commutator means to render an output electrical manifestation representative of the two multiple of said input mulit-order decimal quantity; second electronic gating means interconnecting said electronic means and said plurality of output terminals of said electronic commutator means, said second electronic gating means employing a plurality of transistors logically interconnected with a plurality of grid controlled electron discharge devices, said grid controlled electron discharge devices having the grids thereof connected to said plurality of output terminals of said electronic commutator means, and being selectively responsive to said discrete electrical pulses from said electronic commutator means to render an output electrical manifestation representative of the five multiple of said input multi-order decimal quantity; and additional electronic means interconnected and cooperating with said electronic means and said first and second electronic gating means for rendering, as an output, said nine discrete electrical manifestations respectively representative of one through nine multiples of said input multi-order decimal quantity.

4. An electronic circuit for accepting an electrical manifestation representative of an input multi-order decimal quantity and rendering, as an output, an electrical manifestation representative of the two multiple of said input multi-order decimal quantity, said electronic circuit comprising in combination: an electronic register having a pulrality of decimal order portions for accepting said electrical manifestation representative of said input multi-order decimal quantity and storing an electrical manifestation representative thereof; electronic gating circuit means having a plurality of interconnected portions, each of said portions consisting of a transistor having its collector electrode connected to the suppressor grid of a grid controlled pentode, said interconnected portions of said electronic gating circuit means being selectively connected to said decimal order portions of said electronic register; output terminals connected to said electronic gating circuit means; and electronic commutator means for sequentially electrically pulsing the grid controlled pentode of each portion of said electronic gating means, whereby said output electrical manifestation representative of the two multiple of said input multi-order decimal quantity is manifested electrically at said output terminals.

5. An electronic circuit for accepting an electrical manifestation representative of an input multi-order decimal quantity and rendering, as an output, an electrical manifestation representative of the five multiple of said input multi-order decimal quantity, said electronic circuit comprising in combination: an electronic register having a plurality of decimal order portions for accepting said electrical manifestation representative of said input multi-order decimal quantity and storing an electrical manifestation representative thereof; electronic gating circuit means having a plurality of interconnected portions, each portion consisting essentially of a plurality of transistors and a plurality of grid controlled electron discharge devices logically connected thereto, said interconnected portions of said electronic gating circuit means being selectively connected to said decimal order portions of said electronic register; output terminals connected to said electronic gating circuit means; and electronic commutator means having a plurality of output terminals connected to the grids of said plurality of grid controlled electron discharge devices, for sequentially electrically pulsing the grid controlled electron discharge devices of each portion of said electronic gating means, whereby said output electrical manifestation representative of the five multiple of said input multi-order decimal quantity is manifested electrically at said output terminals.

6. An electronic circuit for accepting an electrical manifestation representative of an input multi-order decimal quantity and rendering as an output an electrical manifestation representative of the two multiple of said input multi-order decimal quantity, said electronic circuit comprising in combination: a first electronic register for accepting and storing the units order of said input multi-order decimal quantity, said first electronic register including a "0" output terminal, a "1" output terminal, a "2" output terminal, a "3" output terminal, a "4" output terminal, a "5" output terminal, a "6" output terminal, a "7" output terminal, a "8" output terminal and a "9" output terminal, said first electronic register including means for impressing a discrete electrical potential on only the one of said "0" through "9" output terminals corresponding to the magnitude of the units order of said input multi-order decimal quantity; a second electronic register for accepting and storing the tens order of said input multi-order decimal quantity, said second electronic register including a "00" output terminal, a "10" output terminal, a "20" output terminal, a "30" output terminal, a "40" output terminal, a "50" output terminal, a "60" output terminal, a "70" output terminal, a "80" output terminal and a "90" output terminal, said second electronic register including means for impressing a discrete electrical potential on only the one of said "00" through "90" output terminals corresponding to the magnitude of the tens order of said input multi-order decimal quantity; a third electronic register for accepting and storing the hundreds order of said input multi-order decimal quantity, said third electronic register including a "000" output terminal, a "100" output terminal, a "200" output terminal, a "300" output terminal, a "400" output terminal, a "500" output terminal, a "600" output terminal, a "700" output terminal, a "800" output terminal and a "900" output terminal, said third electronic register including means for impressing a discrete electrical potential on only the one of said "000" through "900" output terminals corresponding to the magnitude of the hundreds order of said input multi-order decimal quantity; first electronic gating means, said first electronic gating means including a first transistor having an emitter, collector and base, a second transistor having an emitter, collector and base, a first pentode having an anode, cathode, suppressor grid, screen grid and control grid, a direct connection between said "1" output terminal of said first electronic register and said emitter of said first transistor, a direct connection between said "6" output terminal of said first electronic register and said emitter of said second transistor, a direct connection between said collector of said first transistor, said suppressor grid of said first pentode and said collector of said second transistor, a third transistor having an emitter, collector and base, a fourth transistor having an emitter, collector and base, a second pentode having an anode, cathode, suppressor grid, screen grid and control grid, a direct connection between said "2" output terminal of said first electronic register and said emitter of said third transistor, a direct connection between said "7" output terminal of said first electronic register and said emitter of said fourth transistor, a direct connection between said collector of said third transistor, said suppressor grid of said second pentode, and said collector of said fourth transistor, a fifth transistor having an emitter, collector and base, a sixth transistor having an emitter, collector and base, a third pentode having an anode, cathode, suppressor grid, screen grid and control grid, a direct connection between said "3" output terminal of said first electronic register and said emitter of said fifth transistor, a direct connection between said "8" output terminal of said first electronic register and said emitter of said sixth transistor, a direct connection between said collector of said fifth transistor, said suppressor grid of said third pentode, and said collector of said sixth transistor, a seventh transistor having an emitter, collector and base, an eighth transistor having an emitter, collector and base, a fourth pentode having an anode, cathode, suppressor grid, screen grid and control grid, a direct connection between said "4" output terminal of said first electronic register and said emitter of said seventh transistor, a direct connection between said "9" output terminal of said first electronic register and said emitter of said eighth transistor, a direct connection between said collector of said seventh transistor, said suppressor grid of said fourth pentode and said collector of said eighth transistor, a direct conneton between said bases of said first, third, fifth and seventh transistors and said "0" output terminal of said first electronic register, a direct connection between said bases of said second, fourth, sixth and eighth transistors and said "5" output terminal of said first electronic register, said first electronic gating means further including an output terminal for manifesting electrically the units decimal order of said two multiple of said input multi-order decimal quantity; second electronic gating means connected to said "00" through "90" output terminals of said second electronic register, said second electronic gating means including nine similar portions, each portion consisting essentially of the logical interconnection of a transistor and a grid controlled pentode, said second electronic gating means including an output terminal commonly connected to each of said nine portions, said output terminal of said second electronic gating means manifesting electrically the tens decimal order of said two multiple of said input multi-order decimal quantity; third electronic gating means connected to said "000" through "900" output terminals of said third electronic register, said third electronic gating means inclding nine similar portions, each portion consisting essentially of the logical interconnection of a transistor and a grid controlled pentode, said third electronic gating means including a first output terminal commonly connected to each of said nine portions, said first output terminal of said third electronic gating means manifesting electrically the hundreds decimal order of said two multiple of said input multi-order decimal quantity, said third electronic gating means including a second output terminal commonly connected to each of five portions of said nine portions, said second output terminal of said third electronic gating means manifesting electrically the thousands decimal order of said two multiple of said input multi-order decimal quantity; first carry circuit means interconnecting said first and second electronic gating means; second carry circuit means interconnecting said second and third electronic gating means; electronic commutator means having a plurality of output terminals connected to said control grids of said first, second, third and fourth pentodes of said first electronic gating means, said nine grid controlled pentodes of said second electronic gating means, and said nine grid controlled pentodes of said third electronic gating means, each of said plurality of output terminals of said electronic commutator having a discrete electrical pulse thereon during successive displaced discrete time intervals, whereby said two multiple of said input multi-order decimal quantity is electrically manifested at said output terminals of said first, second and third electronic gating means by differentially timed output pulses appearing thereat.

1. An electronic circuit for accepting an electrical manifestation representative of an input multi-order decimal quantity and rendering as an output an electrical manifestation representative of the two multiple of said input multi-order decimal quantity, said electronic circuit comprising in combination: a first electronic register for accepting and storing the units order of said input multi-order quantity, said first electronic register including a "0" output terminal, a "1" output terminal, a "2" output terminal, a "3" output terminal, a "4" output terminal, a "5" output terminal, a "6" output terminal, a "7" output terminal, a "8" output terminal, and a "9" output terminal, said first electronic register including means for impressing a discrete electrical potential on only the one of said "0" through "9" output terminals corresponding to the magnitude of the units order of said input multi-order decimal quantity; a second electronic register for accepting and storing the tens order of said input multi-order decimal quantity, said second electronic register including a "00" output terminal, a "10" output terminal, a "20" output terminal, a "30" output terminal, a "40" output terminal, a "50" output terminal, a "60" output terminal, a "70" output terminal, a "80" output terminal and a "90" output terminal, said second electronic register including means for impressing a discrete electrical potential on only the one of said "00" through "90" output terminals corresponding to the magnitude of the tens order of said input multi-order decimal quantity; a third electronic register for accepting and storing the hundreds order of said input multi-order decimal quantity, said third electronic register including a "000" output terminal, a "100" output terminal, a "200" output terminal, a "300" output terminal, a "400" output terminal, a "500" output terminal, a "600" output terminal, a "700" output terminal, a "800" output terminal and a "900" output terminal, said third electronic register including means for impressing a discrete electrical potential on only the one of said "000" through "900" output terminals corresponding to the magnitude of the hundreds order of said input multi-order decimal quantity; first electronic gating means, said first electronic gating means connected to said "0" to "9" output terminals of said first electronic register, said first electronic gating circuit means including four similar portions, each portion consisting essentially of the logical interconnection of a first transistor, a second transistor, and a grid controlled pentode, said first electronic gating means including an output terminal commonly connected to each of said four portions, said output terminal of said first electronic gating means manifesting electrically the units decimal order of said two multiple of said input multi-order decimal quantity; second electronic gating means connected to said "00" through "90" output terminals of said second electronic register, said second electronic gating means including nine similar portions, each portion consisting essentially of the logical interconnection of a transistor and a grid controlled pentode, said second electronic gating means including an output terminal commonly connected to each of said nine portions, said output terminal of said second electronic gating means manifesting electrically the tens decimal order of said two multiple of said input multi-order decimal quantity; third electronic gating means connected to said "000" through "900" output terminals of said third electronic register, said third electronic gating means including nine similar portions, each portion consisting essentially of the logical interconnection of a transistor and a grid controlled pentode, said third electronic gating means including a first output terminal commonly connected to each of said nine portions, said first output terminal of said third electronic gating means manifesting electrically the hundreds decimal order of said two multiple of said input multi-order decimal quantity, said third electronic gating means including a second output terminal commonly connected to each of five portions of said nine portions, said second output terminal of said third electronic gating means manifesting electrically the thousands decimal order of said two multiple of said input multi-order decimal quantity; first carry circuit means interconnecting said first and second electronic gating means; second carry circuit means interconnecting said second and third electronic gating means; electronic commutator means having a plurality of output terminals connected to said four grid controlled pentodes of said first electronic gating means, said nine grid controlled pentodes of said second electronic gating means, and said nine grid controlled pentodes of said third electronic gating means, each of said plurality of output terminals of said electronic commutator having a discrete electrical pulse thereon during successive time displaced discrete time intervals, whereby said two multiple of said input multi-order decimal quantity is electrically manifested at said output terminals of said first, second and third electronic gating means by differentially timed output pulses appearing thereat.

8. An electronic circuit for accepting an electrical manifestation representative of an input decimal quantity and rendering as an output an electrical manifestation representative of the two multiple of said input multi-order decimal quantity, said electronic circuit comprising in combination: a first electronic register for accepting and storing the units order of said input multi-order decimal quantity, said first electronic register including a "0" output terminal, a "1" output terminal, a "2" output terminal, a "3" output terminal, a "4" output terminal, a "5" output terminal, a "6" output terminal, a "7" output terminal, a "8" output terminal and a "9" output terminal, said first electronic register including means for impressing a discrete electrical potential on only the one of said "0" through "9" output terminals corresponding to the magnitude of the units order of said input multi-order decimal quantity; first electronic gating means, said first electronic gating means including a first transistor having an emitter, collector and base, a second transistor having an emitter, collector and base, a first pentode having an anode, cathode, suppressor grid, screen grid and control grid, a direct connection between said "1" output terminal of said first electronic register and said emitter of said first transistor, a direct connection between said "6" output terminal of said first electronic register and said emitter of said second transistor, a direct connection between said collector of said first transistor, said suppressor grid of said first pentode and said collector of said second transistor, a third transistor having an emitter, collector and base, a fourth transistor having an emitter, collector and base, a second pentode having an anode, cathode, suppressor grid, screen grid and control grid, a direct connection between said "2" output terminal of said first electronic register and said emitter of said third transistor, a direct connection between said "7" output terminal of said first electronic register and said emitter of said fourth transistor, a direct connection between said collector of said third transistor, said suppressor grid of said second pentode, and said collector of said fourth transistor, a fifth transistor having an emitter, collector and base, a sixth transistor having an emitter, collector and base, a third pentode having an anode, cathode, suppressor grid, screen grid and control grid, a direct connection between said "3" output terminal of said first electronic register and said emitter of said fifth transistor, a direct connection between said "8" output terminal of said first electronic register and said emitter of said sixth transistor, a direct connection between said collector of said fifth transistor, said suppressor grid of said third pentode, and said collector of said sixth transistor, a seventh transistor having an emitter, collector and base, an eighth transistor having an emitter, collector and base, a fourth pentode having an anode, cathode, suppressor grid, screen grid and control grid, a direct connection between said "4" output terminal of said first electronic register and said emitter of said seventh transistor, a director connection between said "9" output terminal of said first electronic register and said emitter of said eighth transistor, a direct connection between said collector of said seventh transistor, said suppressor grid of said fourth pentode and said collector of said eighth transistor, a direct connection between said bases of said first, third, fifth and seventh transistors and said "0" output terminal of said first electronic register, a direct connection between said bases of said second, fourth, sixth and eighth transistors and said "5" output terminal of said first electronic register, said first electronic gating means further including a units output terminal and a tens output terminal for respectively manifesting electrically the units decimal order and the tens decimal order of said two multiple of said input decimal quantity; electronic commutator means having a plurality of output terminals connected to said control grids of said first, second, third and fourth pentodes of said first electronic gating means, each of said plurality of output terminals of said electronic commutator having a discrete electrical pulse thereon during successive time displaced discrete time intervals, whereby said two multiple of said input decimal quantity is electrically manifested at said output terminals of said first electronic gating means by differentially timed output pulses appearing thereat.

References Cited in the file of this patent

UNITED STATES PATENTS

| | | |
|---|---|---|
| 2,192,003 | Bryce | Feb. 27, 1940 |
| 2,192,729 | Dickinson | Mar. 5, 1940 |
| 2,199,537 | Campbell | May 7, 1940 |
| 2,521,418 | Sens-Olive | Sept. 5, 1950 |
| 2,528,394 | Sharpless et al. | Oct. 31, 1950 |
| 2,615,624 | Brand | Oct. 28, 1952 |
| 2,616,626 | Lake | Nov. 4, 1952 |
| 2,700,503 | Crosman | Jan. 25, 1955 |
| 2,850,233 | Blankenbaker | Sept. 2, 1958 |
| 2,934,269 | Havens et al. | Apr. 26, 1960 |

FOREIGN PATENTS

| | | |
|---|---|---|
| 1,084,147 | France | June 30, 1954 |